United States Patent
Kaiser et al.

(10) Patent No.: US 11,841,314 B2
(45) Date of Patent: Dec. 12, 2023

(54) METHOD AND SYSTEM FOR CHARACTERIZING PARTICLES USING AN ANGULAR DETECTION IN A FLOW CYTOMETER

(71) Applicants: Deutsches Rheuma-Forschungszentrum Berlin, Berlin (DE); A·P·E Angewandte Physik & Elektronik GmbH, Berlin (DE)

(72) Inventors: Toralf Kaiser, Birkenwerder (DE); Daniel Kage, Falkensee (DE); Claudia Giesecke-Thiel, Berlin (DE); Konrad von Volkmann, Berlin (DE)

(73) Assignees: Deutsches Rheuma-Forschungszentrum Berlin, Berlin (DE); A.P.E Angewandte Physik & Elektronik GmbH, Berlin (DE)

( * ) Notice: Subject to any disclaimer, the term of this patent is extended or adjusted under 35 U.S.C. 154(b) by 234 days.

(21) Appl. No.: 17/360,272

(22) Filed: Jun. 28, 2021

(65) Prior Publication Data
US 2022/0003660 A1    Jan. 6, 2022

(30) Foreign Application Priority Data

Jul. 2, 2020   (EP) .................................... 20183798
Oct. 14, 2020   (EP) .................................... 20201748

(51) Int. Cl.
*G01N 15/14*    (2006.01)
*G01N 15/10*    (2006.01)

(52) U.S. Cl.
CPC ..... *G01N 15/1459* (2013.01); *G01N 15/1436* (2013.01); *G01N 2015/1006* (2013.01); *G01N 2015/149* (2013.01)

(58) Field of Classification Search
CPC .......... G01N 15/1459; G01N 15/1436; G01N 2015/1006; G01N 2015/149;
(Continued)

(56) References Cited

U.S. PATENT DOCUMENTS 6,228,652 B1 *   5/2001   Rodriguez ............. G01N 15/14
                                                      436/63
8,913,121 B2 *  12/2014   Gesley .................. G06T 7/0012
                                                      348/79
(Continued)

FOREIGN PATENT DOCUMENTS

EP        3 244 191 A1    11/2017

OTHER PUBLICATIONS

Extended European Search Report in European Patent Application No. EP20201748.9 dated Apr. 19, 2021.
(Continued)

*Primary Examiner* — Roy M Punnoose
(74) *Attorney, Agent, or Firm* — Knobbe, Martens, Olson & Bear, LLP

(57) ABSTRACT

The invention relates to a method and system for characterizing particles using a flow cytometer comprising detecting radiated light from the particles using two or more detectors positioned to allow for the detection in two or more angular directions and generating a waveform, as a digital representation for the detected radiated light for each of said angulation direction. The waveforms are transformed using
(Continued)

one or more basis functions to obtain one or more coefficients characterizing the waveform. The one or more coefficients characterizing the waveform preferably correspond to properties of the particle(s), thereby enabling analysis of physical properties of the particles (such as size, shape, refractive index) or biological properties of the particles (such as cell type, cell cycle state or localization or distribution of molecules within the cell and/or on the cell surface). In preferred embodiments the method and system are used for a label-free sorting of particles, in particular biological cells.

19 Claims, 7 Drawing Sheets

(58) Field of Classification Search
CPC ... G01N 2015/0053; G01N 2015/0065; G01N 15/0211; G01N 15/1434; G01N 2015/0238; G01N 2015/025; G01N 2015/0294; G01N 2015/1402; G01N 2015/1493; G01N 2015/1497; G01N 15/1429
See application file for complete search history.

(56) References Cited

U.S. PATENT DOCUMENTS

| | | | |
|---|---|---|---|
| 9,074,978 B2 * | 7/2015 | Lo | G01P 5/001 |
| 2005/0105077 A1 | 5/2005 | Padmanabhan et al. | |
| 2010/0232675 A1 * | 9/2010 | Ortyn | G06V 20/695 |
| | | | 382/134 |
| 2012/0069170 A1 * | 3/2012 | Gesley | G06T 7/0012 |
| | | | 348/79 |
| 2012/0287435 A1 * | 11/2012 | Adams | G01N 15/1429 |
| | | | 356/340 |
| 2013/0016335 A1 * | 1/2013 | Lo | G01N 15/1484 |
| | | | 356/28 |
| 2017/0315122 A1 | 11/2017 | Li et al. | |
| 2017/0322137 A1 * | 11/2017 | Feher | G01N 15/1429 |

OTHER PUBLICATIONS

Dickinson, Beckton, "BD LSRFortessa™ X-20 Special Order Product Designed for Limited Space and boundless Potential," Jan. 1, 2013, XP055793351, Retrieved from the Internet: URL:https://www.bdbiosciences.com/ds/is/others/23-14841.pdf, p. 3, lines 5-6.

* cited by examiner

METHOD AND SYSTEM FOR CHARACTERIZING PARTICLES USING AN ANGULAR DETECTION IN A FLOW CYTOMETER

The invention relates to a method and system for characterizing particles using a flow cytometer comprising detecting radiated light from the particles using two or more detectors positioned to allow for the detection in two or more angular directions and generating a waveform, as a digital representation for the detected radiated light for each of said angular direction. The waveforms are transformed using one or more basis functions to obtain one or more coefficients characterizing the waveform. The one or more coefficients characterizing the waveform preferably correspond to properties of the particle(s), thereby enabling analysis of physical properties of the particles (such as size, shape, refractive index, internal structures) or biological properties of the particles (such as cell type, cell cycle state or localization or distribution of molecules within the cell and/or on the cell surface). In preferred embodiments the method and system are used for a label-free sorting of particles, in particular biological cells.

BACKGROUND OF THE INVENTION

Flow cytometry involves the analysis of optical signals produced by suspensions of particles or biological cells passing in a fluid stream through a focused beam of light. The optical signals, derived from radiated light, for example from emission of fluorescence or from light scatter, are converted into voltage-versus-time pulse waveforms through the operation of a detector, such as photodiode or photomultiplier detectors.

Flow cytometry allows simultaneous multi-parametric analysis of the physical and biological characteristics of up to thousands of particles per second. Flow cytometry is routinely used in basic research, to interrogate populations of biological cells that may show cell type or gene/protein expression heterogeneity, in the diagnosis of medical conditions and has many other applications in research and clinical practice. A common application is to physically sort particles based on their properties, so as to purify populations of interest, such as in fluorescence-activated cell sorting (FACS).

Typically, a flow cytometer measures the scatter and fluorescence intensities of cells, for their specific characterization. Common flow cytometers are able to identify multiple different cell-specific properties based on such measurements. In the prior art a number of approaches are known using multiple excitation lasers and detectors to allow for a spectral analysis for the fluorescently labelled particles.

US 2017/315122 A1 discloses a flow cytometer having a plurality of excitation lasers focused in the flow cell at different vertical positions. The detection of the fluorescence emission by means of a collection optics is spatially resolved from the different vertical positions by means of a plurality of detectors. The collection optics translates a vertical separation of the focused laser spots in the flow cell to a separation in a focal plane of a few millimeters. The spatially resolved detection in combination with spectral filters is aimed at allowing for an improved separation of fluorescence signals for different excitation wavelengths.

US 2005/105077 A1 discloses a miniaturized flow cytometer for detection of scattered and fluorescent light. The use of arrays of photodetectors is proposed for the detection of fluorescent light with a variety of different wavelengths ($\lambda 1$-$\lambda n$).

In these and other approaches, the characterization is however mainly based on fluorescence-coupled biomarkers, i.e. the cells must be labeled and the spectral properties of the fluorochromes used must be taken into account.

In addition, some approaches, such as cell cycle analysis, require cell fixation, which restricts downstream experiments or the fluorescence dyes are potentially toxic or interfere with cell functions (Katoh et al. 1999). Alternatively, the scattered light pattern gives information about size, granularity, morphology, refractive index of a cell (Sharpless et al. 1977).

Despite significant advances in flow cytometry analysis, established procedures fail to make effective use of the huge amount of data obtained for any given sample, or for any given particle, being analyzed in the cytometric device. For example, typical flow cytometry techniques employ thresholds in order to reduce background noise from the analysis. This is commonly done by designating a parameter as the trigger and setting a level in that parameter as the threshold. Any pulse that fails to exceed the threshold level is ignored in all detectors; any pulse that surpasses the threshold level is processed by the electronics. Typically, the pulse height, area, and pulse width across a trigger window (pulse time) are recorded.

Analyses of this kind however fail to interrogate more complex aspects of the data obtained by the detector, for example the exact shape of the waveform is not interrogated in detail, thereby potential cell doublets, where two cells are fused together, may not be identified. Cells associated with debris are not differentiated, and potentially valuable information on cell shape is lost.

Some improvements have been made in this respect, such as in the methods described in EP 1865303 and WO 2016/022276. These methods enable the detection of characteristic parameters of the cells, or of multi-peak signals, based on a waveform analysis. However, the detection and determination of such waveform characteristics is typically carried out based on the height and width of the waveform, with or without some approximation of waveform, thereby discarding detailed information on the particular shape of the waveform as detected.

EP 3244191 A1 considerably improved upon these methods and proposes an analysis of the time-dependent pulse shapes using preferably a wavelet transformation and obtaining wavelet coefficients that may be assigned to biological or physical properties of a cell. As disclosed in EP 3244191 A1 such a more detailed analysis of time-dependent pulse shapes allows for label-free characterization of particles based upon forward scattering (FSC) or side scattering signals (SSC).

In a state-of-the-art cytometer, these scattered light signals are detected at an angle of 0-20° (FSC) and 90° (SSC) relative to the position of the excitation laser beam which enable the differentiation of e.g. monocytes, lymphocytes, granulocytes.

While the methods described in EP 3244191 A1 allow for a label-free characterizing of various cell types or cell states with considerable accuracy, room for improvement exists. In particular, when the overall shape or morphology of the cell types to be distinguished are similar, even the more detailed analysis of time-dependent FSC or SSC pulse shape may not be sufficient to secure a reliable distinction.

In light of the prior art there remains thus a need to provide additional or alternative means for flow cytometric systems or methods, which improves upon the identification and/or characterization of the properties of the particles subject to analysis.

SUMMARY OF THE INVENTION

In light of the prior art the technical problem underlying the present invention is to provide alternative and/or improved means for characterizing particles in a flow cytometer.

This problem is solved by the features of the independent claims. Preferred embodiments of the present invention are provided by the dependent claims.

The invention relates to a method and system for characterizing particles using a flow cytometer comprising detecting radiated light, preferably scattered light, of the particles in two or more angular directions and generating for each of the angular directions a waveform, as a digital representation of the detected radiated light for said angular direction, and transforming each waveform using one or more basis functions and obtaining one or more coefficients characterizing the waveform.

The invention therefore relates to a method for characterizing particles using a flow cytometer comprising:
  a. passing of one or more particles in a fluid stream through a light beam of the flow cytometer,
  b. detecting radiated light as one or more particles pass through the light beam using two or more detectors positioned to allow for the detection of the radiated light in two or more angular directions,
  c. generating for each of the angular directions a waveform which is a digital representation of the detected radiated light for said angular direction, and
  d. transforming each waveform using one or more basis functions and obtaining one or more coefficients characterizing the waveform.

The method is preferably characterized in that the radiated light of the one or more particles is analysed in a time-dependent manner with respect to two, three, four or more angular directions. The inventors have realized that by combining a time-dependent analysis of the waveform of the scattered light using waveform transformation together with a multi-angular detection scheme provides a wealth of additional information that allows for a particular reliable characterization of particle properties. For instance, the method is particularly sensitive with respect to local differences in refractive index of the particles, such that even particles exhibiting a close similarity in terms of shape and/or morphology, but differing overall or locally in respect to a refractive index may be distinguished with surprising accuracy.

The methods thus allow for instance for a label-free distinction of different cell types or identical cell types, which differ in the localization, co-localization or distribution of molecules therein.

The method is preferably characterized in that the one or more coefficients characterizing of the waveform for a respective angular direction correspond to particular properties of the particle(s), thereby enabling analysis of physical properties of the particles (such as refractive index or morphology) or biological properties (such as cell type or localization of biomarkers) in particular when the particles are biological cells, or other properties of the particles. According to the invention, the discovery that a coefficient characterizing a waveform corresponds to particular properties of the particle(s) may preferably imply using control and/or calibration samples for particular particle populations to be detected, for example for doublets, debris, cell types, or desired cell populations. By obtaining coefficients for particular control and/or calibration particles, the subsequent analysis enables comparison between coefficients of controls and measured samples, enabling particle characterization.

Notably, in standard flow cytometers, the scattered light is integrated over a wider angular range by using one detector in the forward scatter (FSC) channel or the side scatter (SSC) signal. Likewise, the time-dependent scattered light signals in standard flow cytometers as usually reduced to three values: pulse height, area and width.

The inventors have realized that by integrating over a wider angular range valuable information is lost. Similarly, the common reduction of the time-dependent signal to a description of the pulse shape to height, area, or width (H, A, W) as in standard flow cytometer data files strips valuable information from the scattering signal.

To utilize the theoretically available but so far unused wealth of information of scattered light of the particles, the present invention suggests for the first time a combination of angular-specific detection of the radiated light, e.g. using multiple FCS or SSC detectors, with a time-dependent analysis of the angular-specific waveforms.

Expressions such as angle-specific or angle-resolved are preferably used synonymously herein and relate to a detection of the radiated light in two, three, four, five or more angular directions, preferably in vicinity of a main angular direction. Contrary to prior art approaches of detecting for instance an FSC signal or a SSC signal using a single detector for the corresponding main direction of detection, the angular resolved detection encompasses a detection of the radiated light in two, three, four or more angular directions, which preferably deviate from the said main direction of detection by no more than 20°, preferably 10°, more preferably 5°.

As used herein an angular direction for the detection of radiated light is preferably defined by a relative angle with respect to the propagation of the light beam, which illuminates the passing particles.

Preferably at least two angular directions of the two, three, four, five or more angular directions in which the radiated light is detected differ by at least 1°, preferably at least 2°, 3°, 4°, 5°, 6°, 7°, 8°, 9°, 10° or more.

In a preferred embodiment the angle-resolved detection using two, two, three, four, five or more or more detectors for detecting the radiated light in two or more angular directions thus spans an angular range of at least 1°, 2°, 3°, 4°, 5°, 6°, 7°, 8°, 9°, 10° or more. The higher the number of detectors used for covering the angular range, the better will be the angular resolution.

In a further preferred embodiment the angle-resolved detection using two or more detectors for detecting the radiated light in two or more angular directions spans an angular range of at least 1°, 2°, 3°, 4°, 5°, 6°, 7°, 8°, 9°, 10° or more around a main angular direction or detection (e.g. FCS or SSC), while not deviating from the said main angular direction by more than 20°, preferably no more than 10°. A forward scatter detection may preferably occur in a main angular direction of approximately 0° with respect to incident light beam, while a side scatter detection will exhibit a main detection direction at an angle of approximately 90° to incident light beam. Similar to an SSC a fluorescence signal is in the prior art preferably be detected in a main angular direction at angle of approximately 90° with respect to the excitation beam. However, any angle in between 0° and 90° may be used, since the emitted fluorescence is typically isotropic.

Notably, in the prior art the detection of radiated light for a given main detection direction, e.g. FSC or SSC, a single detector is used, typically in a set up integrating over a wider angular range around said main direction.

An angular-resolved detection scheme according to the invention on the contrary proposes that instead at least two different angular directions, preferably three, four, five or more are detected in reference to a single main detection direction. To this end a detection in a single angular direction should preferably integrate the angular scattering signal over an angle of not more than 2°, preferably not more than 1°. Hereby, a particular fine angular resolution can be achieved.

In a preferred embodiment of the method the detected radiated light is a forward scatter signal, a side scatter signal and/or a fluorescence light and the two or more detectors are positioned to allow for detection of a forward scatter signal, a side scatter signal and/or a fluorescence light in two or more angular directions. As stated above, for carrying out an angular resolved detection of the radiated light it is particular preferably to acquire an FSC, an SSC or a fluorescent light in at least two, preferably three, four or more angular directions, preferably in the vicinity of a main angular direction, preferably having an angle in a range of 0° (forward) to 90° (side).

As the data shows, an angular resolved detection of the radiated light, e.g. FSC, SSC or fluorescence, allows for a valuable insight on the physical and/or biological properties of the particles that would be lost using a single detector for a single angular direction to acquire an FSC, SSC or fluorescence signal.

In a further preferred embodiment, the radiated light is detected using three or more detectors linearly arranged along a one-dimensional array. Such a linear detector arrangement allows for straightforward detection of three or more angular directions in the vicinity of a main detection direction. The main detection direction preferably relates to the positioning of the one-dimensional detector array in respect to the excitation beam, for instance at 0° (forward) or 90° (side).

Optical setup for collection of the radiated light as well as the spacing and/or dimension of the three or more detectors on said one-dimensional array will govern the three or more angular directions, in which the radiated light is detected. For instance, as depicted in FIG. 2 detection optics including a collimator lens and focusing lens may be used to detect a forward scatter signal and guide the detected light with angular resolution onto a linear array of detectors.

In preferred embodiment the linear one-dimensional array may be positioned symmetrically or asymmetrically with respect to a main detection direction, e.g. an FSC or SSC, signal.

For instance, three or more detectors may be positioned asymmetrically with an offset (e.g. above) a main detection direction (see FIG. 2). Alternatively, six or more detectors may be positioned symmetrically (e.g. above and below) about a main detection direction. Herein, the directions above or below are preferably defined in respect to the flow of the particles, such that "above" refers to a direction upstream and "below" refers a direction "downstream".

A symmetrical setup of linear detectors about a main detection direction may allow for further calibration and/or further analysis since two detectors equally spaced e.g. above and below the transmission direction of the incident beam will exhibit the same relative angle with respect to said incident beam. Deviation in the signals can be attributed to either detection noise (thus used for calibration) or reflect an orientation of the particle as it moves along the flow propagation through the illumination.

A linear detector array may be applied to the detection of an FSC, SSC or fluorescence signal alike.

In a preferred embodiment the radiated light is a forward scatter signal and detected using three, four, five, six, seven or more detectors linearly arranged along a one-dimensional array.

In a preferred embodiment the radiated light is a side scatter signal and detected using three, four, five, six, seven or more detectors linearly arranged along a one-dimensional array.

In a preferred embodiment the radiated light is a fluorescence signal and detected using three, four, five, six, seven or more detectors linearly arranged along a one-dimensional array.

In a particular preferred embodiment, the radiated light is detected using four or more detectors in two-dimensional array, Having a two-dimensional array of detectors allows for a particular fine angular resolution of the radiated signal. In some embodiments a two-dimensional array with 5, 10, 15, 20, 25, 30, 35, 40, 50 or more detectors for detecting the radiated light in an equal number of angular directions may be preferred.

In preferred embodiments said two-dimensional array of detectors may be centrally aligned with a main detection direction, e.g. a forward direction (FCS) or side direction (SSC). Such a two-dimensional array allows for a particular comprehensive analysis of particle properties that uses the wealth of information encompassed by a spatial-temporal radiation pattern of the illuminated particles. Hereby, it is possible to detect a difference in the radiated light not only with respect to a relative angle with the excitation beam, but also in respect to the flow direction of the particles or an orientation of the particles within said flow stream. Using the time-dependent analysis described for each of the waveforms detected in the particular angular directions allows thus to gain further valuable insight on particle properties.

In some embodiments nine or more detectors arranged on radial beams about a central axis are used. Preferably the central axis of the detector arrangement may be aligned with a main detection direction, e.g. with the transmission direction of an excitation beam for an angular resolution of a forward scatter signal. In other words each of the radial beams may correspond to a one-dimensional array on which three or more detectors are linearly aligned (see FIG. 2a).

In a preferred embodiment a detection of the radiated light using a two-dimensional array of detectors may be performed by positioning a two-dimensional array of optical fibres and connecting each of said fibres to a respective detector, such as for instance photo multiplier tubes (PMT), silicon-photo-multiplies (SiPMs), photodiodes or avalanche photo diode. Advantageously, the optical fibres may be positioned compact and precisely within a single detection cable providing for a dense detection arrangement with a fine angular resolution.

The above described embodiments illustrate detection of the radiated light may be performed in two, three, four, five, six or many more angular directions, thus capturing information on the spatial radiation pattern of the passing particle.

Importantly, however said spatial information is used in combination with a temporal analysis by detecting the radiated light in each of the angular directions for at least the time period that the particle passes the illumination beam and generates a waveform which is a digital representation of the detected radiated light for each of said angular directions. The waveform is thus a digital representation for a time-dependent signal generated at a detector with respect to a particular angular direction and may be also referred to herein as a "pulse shape".

Contrary to common approaches for flow cytometry the temporal information contained in the waveform, i.e. pulse shape, is not reduced to a pulse height, area, or width. Instead a waveform transformation using one or more basis functions is performed allowing for the provision of one or more coefficients characterizing a waveform, which may preferably be used for assigning biological and/or physical properties of the particles.

In preferred embodiments a wavelet transformation or Fourier transformation are employed. These examples shall however not be limiting to the methods and systems of the present invention.

The Fourier and wavelet transformations are unified by common functional principles. Typically, signal processing in any given application transforms a time-domain signal into another domain, with the purpose of extracting the characteristic information embedded within the time series that is otherwise not readily available in its original form. Mathematically, this can be achieved by representing the time-domain signal as a series of coefficients, based on a comparison between the signal and a set of known template or basis functions (Wavelets, Theory and Applications for Manufacturing; Gao and Yan, 2011, XIV, p 224; Springer). Both Fourier and Wavelet transformations fall into this category of mathematical transformations useful in analysis of signal processing.

Through the application of these mathematical techniques in assessing the waveforms for each of the angular directions of the analyzed particles significant improvements are achieved.

The present invention enables interrogation of more detailed characteristics of the particles, which takes into account a close approximation of the waveform, as represented by the coefficients of the basis function.

Where systems of the prior art have significantly reduced the analyzed data to waveform peak height, width, skew, kurtosis, slope, waviness or multi-peak forms, the present invention enables characterization of every waveform for each detected angular direction with a high degree of accuracy.

The coefficients of the present invention, when combined with the basis function, provide an accurate description of the true wave form, without needing to record and store all data points obtained from the detector. The present invention therefore enables a fast and efficient processing of the data derived by the detector, which is especially beneficial given the multi-angle detection of the radiated light.

By dealing with waveform abstractions based on the mathematical transformations described herein, the invention enables the processing and assessment of coefficients of basis functions in order to obtain detailed representation of waveform, without having to deal with unmanageable amounts of raw data, as would be required if the shape of the waveform itself was directly analyzed, as obtained from the detector.

Moreover, by obtaining a set of coefficients that characterize the waveforms for each of the angular directions, the identities and/or properties of the corresponding particles may be determined without relying on theoretical assumptions.

Instead for instance, a calibration sample of particles with known common properties (e.g. a certain cell type or state) may be characterized using the method described herein, to arrive at a set of coefficients for each waveform representing the different angular directions. Using a sufficient number of such reference particles and preferably applying statistical methods such as a multivariate statistical model as described herein, a set of decisive coefficients may be deduced that serve as a characteristic flow cytometric fingerprint for these particles.

Applying subsequently the method to a pool of unknown particles said identified set of coefficients may serve to reliable identify particles with the desired common property. Advantageously, the method thus allows for an efficient and label-free sorting of particles based upon a spatial-temporal analysis of the scattering light alone.

Different waveform transformations may be preferred for obtaining the coefficients characterizing the waveform.

In one embodiment of the invention the method of the present invention is characterized in that the waveform is transformed by a wavelet transformation. In one embodiment of the invention the wavelet transformation is a discrete wavelet transformation, a continuous wavelet transformation, a single level wavelet transformation, a multilevel wavelet transform or combinations thereof.

A wavelet is preferably a wave-like oscillation with an amplitude, such that the area under the curve (equivalently the definite integral) is zero and must decay rapidly (i.e. it is localized). Generally, wavelets are created to have specific properties that make them useful for signal processing. As a mathematical tool, wavelets can be used to extract information from many different kinds of data, such as audio or light signals and images.

Wavelet transforms, or wavelet transformations, similar to Fourier transforms, can be considered as transformations of data in function space to a different domain. In the new domain the information content of the data can often be extracted with fewer and/or simpler mathematical treatments. For the Fourier transform the new domain is reached by projecting signals onto basis functions that are sine and cosine functions. For the wavelet transform, it can be reached by projecting onto an infinite number of possible basis function sets called wavelets. These wavelet basis functions meet certain mathematical criteria. They can be chosen from known sets or designed by the user to suit the particular application. While Fourier transforms could also be applied to the measured pulses with some degree of success, Fourier analysis is generally more suited to signals that extend in time and have a periodic component. Given that the pulse is measured in a specific trigger window, and the cell-related high frequency component is not periodic within the trigger window, the information can be considered as localized and thus particularly suited to wavelet analysis.

One skilled in the art will know the basis functions of different wavelet transformations. Examples of wavelet transformations may be selected appropriately by a skilled person (see Wavelets, Theory and Applications for Manufacturing; Gao and Yan, 2011, XIV, p 224; Springer; Gilbert Strang and Truong Nguyen, Wavelets and Filter Banks, Wellesley-Cambridge Press, 1996; Amara Graps, "An Introduction to Wavelets," IEEE Computational Science and Engineering, Summer 1995, Vol. 2, No, 2; Wavelet Methods in Statistics with R' by Guy Nason, Springer, Use R! Series).

For x (a real number), let $\psi(x)$ denote a suitable 'mother wavelet'. Wavelets can then be generated by dilation and translation such that:

$$\psi_{jk} = 2^{\frac{j}{2}} \psi(2^j x - k)$$

If f(x) is the function to be decomposed, the wavelet coefficients are found by $$d_{jk} = \int_{-\infty}^{\infty} f(x) \psi_{jk}(x) dx.$$

Thus, the transform is evaluated at different locations (translation) and different scales (dilation). This is the continuous form that could be evaluated at an infinite number of locations and scales. For a discrete sequence, this form could also be used (by evaluating at every discrete location and an infinite choice of scales). However, it is more computationally efficient as well as parsimonious to use the decimated discrete wavelet transformation which is evaluated at select scales (without loss of information) in near linear time. The low computational complexity makes it ideal for implementation in hardware. The undecimated discrete wavelet transformation as well as wavelet packet transformations (both decimated and undecimated) could also be used.

In contrast to Fourier transformation, the wavelet transformation projects signals onto wavelets as basis functions instead of sine and cosine functions. Fourier analysis is generally well suited for periodic signals. However, in a flow cytometer the pulses are generated within a certain trigger window. Therefore, the cell-related high-frequency component of the pulse can be considered as localized within the trigger window and is therefore particularly suitable for wavelet analysis.

In one embodiment of the invention the method described herein is characterized in that the basis function of the discrete wavelet transformation is selected from Haar wavelets, Daubechies wavelets or symlet wavelet. Herein, symlet wavelets represent a modified version of Daubechies wavelets with an increased symmetry.

Preferred but non-limiting examples of wavelet transform are the dwt and wavedec commands of Matlab, a mathematics and computing platform provided by Mathworks. For example, the dwt command performs a single-level one-dimensional wavelet decomposition. The decomposition is done with respect to either a particular wavelet ('wname') or particular wavelet decomposition filters that can be specified accordingly. [cA,cD]=dwt(X,'wname') computes the approximation coefficients vector cA and detail coefficients vector cD, obtained by a wavelet decomposition of the vector X. The string 'wname' contains the wavelet name.

Alternatively, the wavedec command performs a multi-level one-dimensional wavelet analysis using either a specific wavelet ('wname') or a specific wavelet decomposition filters. [C,L]=wavedec(X,N,'wname') returns the wavelet decomposition of the signal X at level N, using 'wname'. N must be a positive integer. The output decomposition structure contains the wavelet decomposition vector C and the bookkeeping vector L.

In one embodiment of the invention the method the method described herein is characterized in that the waveform is transformed using a Fourier transformation preferably selected from a group comprising discrete Fourier transform, fast Fourier Transforms, short-time Fourier transforms or any combination thereof.

The Fourier transform is one of the most widely used applied signal processing tools in science and engineering.

A skilled person is therefore capable of identifying appropriate transforms and software, using the Fourier transform in signal processing applications. The Fourier transform reveals the frequency of a time series x(t) by transforming it from the time domain into the frequency domain (Wavelets, Theory and Applications for Manufacturing; Gao and Yan, 2011, XIV, p 224; Springe).

In one embodiment the selection of the type of waveform transformation is based upon detecting radiated light for a plurality of particles in two or more angular directions and performing for each of the waveforms representing distinct angular directions two or more different types of waveform transformations and selecting the type of waveform transformation for which the obtained coefficients exhibit a maximal variation across said measured particles.

In a further embodiment the selection of the type of waveform transformation is based upon performing for each of the waveforms representing distinct angular directions two or more different types of waveform transformations and selecting the type of waveform transformation for which the obtained coefficients exhibit a maximal variation across said angular directions.

The inventors have realized that by selecting a type of waveform transformation that maximizes the variation across the coefficients, either for instance across all measured particles or across an angular directions, results in deriving coefficients that reflect particular well upon the particle properties.

Measures for a variation may include standard deviation, variance, interquartile range or any other type of measure that allows for a quantification of a data spread in the derived coefficients characterizing the waveforms.

In one embodiment the waveforms are transformed using a wavelet transformation, wherein a type of mother wavelet and/or decomposition level of the wavelet transformation is selected by detecting radiated light for a plurality of particles in two or more angular directions and performing for each waveform a plurality of different wavelet transformations using different types of mother wavelets and/or decompositions levels and selecting a type of mother wavelet and/or decomposition level for which the obtained coefficients exhibit a maximal variation across the particles.

In one embodiment the waveforms are transformed using a wavelet transformation, wherein a type of mother wavelet and/or decomposition level of the wavelet transformation is selected by performing for each waveform a plurality of different wavelet transformations using different types mother wavelets and/or decompositions levels and selecting a type of mother wavelet and/or decomposition level for which the obtained coefficients exhibit a maximal variation across the angular directions.

In a one embodiment the method is characterized in that the one or more coefficients characterizing the waveform are used for assigning a physical and/or biological property to the one or more particles. Such an assignment is typically not evident in approaches, which merely use a waveform transformation for de-noising or compressing data, e.g. by performing a waveform transformation and regaining the pulse shape based upon the coefficients.

Instead the inventors have realized that the coefficients themselves may be used to assign properties to the particles, which allow for further analysis, sorting or discovery.

In a preferred embodiment an assigned physical or biological property of the one or more particles is selected from the group consisting of size, shape, refractive index, particle type, morphology, granularity, internal structure, localization, co-localization, and/or distribution of molecules within the particle and/or on the particle surface or allows for a distinction between single particles or aggregates of multiple particles.

In a preferred embodiment the particles are selected from a group comprising cells, vesicles, nuclei, microorganisms, beads, proteins, nucleic acids, pollen, extracellular vesicles or any combination thereof.

In a preferred embodiment the particles are cells and the determined property of the cells is or is associated with cell type, cell cycle, localization or distribution of molecules within the cell and/or on the cell surface, the amount of debris among the cells, structural elements of the cell such as the nucleus or the cytoskeleton, antibody or antibody-fragment binding to the cell, cell morphology and/or allows for the distinction between single cells, aggregates of multiple cells, cell dry mass or fragments of cells (debris).

As is demonstrated below in the examples, various cell types, states or properties can be determined from one another in a cytometer based on the method described herein.

Different biological cells exhibit distinct shapes both in vivo and in vitro. For example, bacteria may be easily characterized by their morphological features, being typically categorized into spheres (cocci (plural) or coccus (singular)), rods (bacilli (plural) or bacillus (singular)), and helical (spirilla (plural) or spirillum (singular)). The main arrangements are single cells, diplo- (pairs), staphylo- (clusters), and strepto- (chains). The present invention enables differentiation of various cell shapes based on the transformation mathematics disclosed herein. In addition, the method allows for a reliable distinction even of cells with similar shape that differ in respect to granularity, internal structure, expression patterns of protein or local variation in refractive index.

Mammalian cells also exhibit different morphological features or internal structures and may be accurately characterized using the methods described herein. For example, as described in the examples below, the cell cycle phase for HCT116 could be reliably assigned based upon a multi-angle FCS detection.

In some embodiments the coefficients characterizing the waveforms can be assessed using a multivariate statistical model, such as a principal component analysis or a cluster analysis. The multivariate statistic model comprises multivariate analysis of variance, multivariate regression analysis, factor analysis, canonical correlation analysis, redundancy analysis, correspondence analysis, multidimensional scaling, discriminant function, linear discriminant analysis, clustering systems, recursive partitioning, principal component analysis, non-linear principal component analysis, information preserving component analysis (IPCA), independent component analysis, multidimensional scaling, support vector machines, random forests, partial least squares regression, projection pursuit, boosting and/or artificial neural networks. The principal component analysis can also be termed PCA. The person skilled in the arts knows that PCA is a model of multivariate statistics, which describes a form of statistics encompassing the simultaneous observation and analysis of more than one statistical variable. This analysis enables grouping of the analyzed particles (or their coefficients, as determined by the relevant transform) into subpopulations, such as those associated with particular particle characteristics as described herein.

In some embodiment machine learning algorithms are used in order to discriminate between at least two populations of particles with a different property based upon the corresponding coefficients characterizing the waveforms. To this end the coefficients characterizing the waveforms are determined for a training set of particles e.g. differing cell types. On the training data an appropriate Support Vector Machine (SVM) can be constructed and tuned. The SVM may be constructed using the wavelet coefficients from a training set, e.g. a set of signals from a pool of particles with known properties. To obtain an optimized SVM the parameter combination with the highest classification for the training set is chosen. This optimized SVM may be used to reliable discriminate particles in subsequent testing assays.

In one embodiment the coefficients characterizing the waveforms are analysed using a multivariate statistical model, preferably a principal component analysis or a cluster analysis, and wherein preferably the multivariate statistical model is used to identify clusters or sets of coefficients characterizing said waveforms that indicate a common property of the corresponding particles.

Subsequently the identified clusters or sets of coefficients characterizing said waveforms for the respective angular directions may be used for quantifying the particles with the common property of interest or for sorting, isolating the particles with a common property for further analysis or use.

In a preferred embodiment the method comprises a further step of sorting particles based upon the coefficients characterizing the waveforms. As described below in more detail to this end the flow cytometer may be additional equipped with a sorter.

In a preferred embodiment the waveforms are generated from the detected radiated light using a processing unit that comprises an analog-to-digital converter (ADC).

In a preferred embodiment the waveforms are transformed using a processing unit comprising a (preferably dedicated) digital signal processing unit (DSP) or a field programmable gate array (FPGA).

A further aspect of the invention relates to a flow cytometry system comprising:
 a source for a fluid and particles
 a flow cell configured to generate a fluid stream comprising the particles,
 a light source configured to generate a light beam that illuminates the fluid stream comprising the particles,
 two or more detectors positioned and configured to detect the radiated light of the particles in two or more angular directions, and
 a processing unit configured to generate a waveform based upon the detected radiated light,
characterized in that the processing unit is configured to transform said waveform using one or more basis functions and obtaining one or more coefficients characterizing the waveform.

A person skilled in the art will appreciate that preferred embodiments disclosed for the method for characterizing particles using a flow cytometer equally apply to the flow cytometry system and vice versa.

The source of the system is typically the source of the sample that is provided to the flow cytometer for analysis. The sample includes the individual particles that are illuminated by the light beam (from the light source) and analyzed by the detector.

A light source (which can include one or more light sources) generates at least one light beam that is directed toward the fluid stream. In some embodiments the light beam passes through an optics assembly, such as to focus the light beam onto the fluid stream and thus the particles.

In a preferred embodiment an elliptically focal spot is formed, which preferably resembles a flat ellipse. To this end for instance crossed cylindrical lenses may be used (see e.g.

FIG. 3). The elliptical shape for the focal spot of the beam of illumination may enrich differences in waveforms detected at multiple angles and thus enriches the information that can be gathered from the spatio-temporal radiation pattern of the passing particles.

The light beam from the light source intersects the fluid stream. The particles contained in the light beam disturb the light beam and generate radiated light. The type and pattern of radiated light depends upon the type and size of the particles, but the radiated light can include forward scattered light, side scattered light, back scattered light, as well as fluorescent light (which occurs when light rays are absorbed and reemitted by the particle, which is detectable by the corresponding change in wavelength (i.e., color) of the light rays).

Two or more detectors are provided to detect radiated light at multiple angular directions as described. Detection optics comprising e.g. a collimator lens or focusing lens, may be used to collect the radiated light and focus said light onto two or more detections. The combination of focusing and detection optics will govern the detection location from which the radiated light emitted by the passing particles is collected.

In a preferred embodiment the two or more detectors are positioned in the flow cytometry system to allow for detection of a forward scatter signal, a side scatter signal and/or a fluorescence light in two or more angular directions.

In a preferred embodiment flow cytometry system comprises three or more detectors linearly arranged along a one-dimensional array to detect the radiated light of the particles in three or more angular directions.

In a preferred embodiment the flow cytometry system four or more detectors arranged in a two-dimensional array, preferably nine or more detectors arranged in a two-dimensional array on radial beams about a central axis, to allow for the detection of the radiated light in four or more, preferably nine or more, angular directions.

In a preferred embodiment the flow cytometry system comprises a sorter for the particles configured to sort the particles based upon the coefficients characterizing the waveforms.

This embodiment represents an additional function of the invention, for example by combining the methods and systems disclosed herein with a particle/cell sorting device, such as a flow cytometric cell sorter.

The determination of particular coefficients for particular particles may subsequently be coupled with appropriate sorting technology. For example, the system may be configured so that there is a low probability of more than one particle/cell per droplet. Just before the stream breaks into droplets, the flow passes through a measuring station where the property or characteristic of interest of each particle/cell is measured using the methods described herein. An electrical charging ring is positioned at the point where the stream breaks into droplets. A charge is placed on the ring immediately prior measurement, and the opposite charge is trapped on the droplet as it breaks from the stream. The charged droplets then fall through an electrostatic deflection system that diverts droplets into containers based upon their charge. In some systems, the charge is applied directly to the stream, and the droplet breaking off retains charge of the same sign as the stream. The stream is then returned to neutral after the droplet breaks off.

A particular advantage of the method described herein is that it allows for a label-free sorting of particles, e.g. cells. Known cell sorting devices such as a flow cytometric cell sorter rely on fluorescent markers. By combining a transformation of the waveform to derive coefficients characterizing the properties of the cells with a subsequent sorting device, a fluorescent labelling of cells is not essential to sort different cell types.

Instead forward or side scatter signals of unlabeled cells may be used, wherein a set of coefficients of the angular-specific waveform indicate a certain cell type or cell state.

For instance, forward scatter predominantly relates to the shape or morphology of cells, while side scatter signals are predominantly influenced by internal structures indicating a degree of granularity. Moreover, using the angular specific detection of forward and/or side scatter signal allows to take into account global or local changes in respect to the refractive index of the cells.

Cell types can be distinguished based upon these properties, however previous methods have not been sufficiently fast to allow for a real time sorting, while being sufficiently precise for a label-free distinction of cell types or cell states. For instance, imaging techniques with a subsequent image analysis can precisely identify cell types based on their morphology, but lack speed in order to allow for efficient real time cell sorting applications. Standard flow cell cytometer parameters such as the width or height of the cells cannot reliable discriminate cells types with more subtle morphological differences.

Moreover, using a multi-angular detection scheme together with a time-dependent analysis of the detected waveforms, allows for unprecedented precision in the distinction and subsequent real-time sorting of particles.

Importantly, the method and system described herein does not rely to this end on previous assumptions or models.

Instead for instance, a calibration sample of a desired cell type or state may be characterized using the system described herein to arrive at a set of coefficients for each waveform representing the different angular directions. Applying statistical methods such as a multivariate statistical model on the data allows to determine a characteristic set of such coefficients that reliable identifies the cell type. For instance, the statistical methods may identify particularly deceive angular directions and/or sets of coefficients for these directions together with an appropriate range that indicates a high probability that a detected cell is of the desired cell type.

In some embodiments the two pools of cells may be used for which it is known that they differ in a property of interest. Employing the methods described herein to such distinct pools of cells differing in a property of interest, allows for a particular precise distinction and later on sorting of said cells. The statistical methods may identify those coefficients that show the highest variation in between the pool of cells, as they will likely reflect differing property of interest.

In some embodiments a single pool of cells may be used for which a first set of cells is separately analyzed using the statistical methods described herein to identify sets of defining coefficients and said sets of coefficients are used for subsequently sorting the remaining second set of cells of said pool.

Advantageously, the method and system are not limited to certain cell types, but may be applied to virtually any cell type and even distinguish cell cycle states or differentiation state within a certain cell type. To this end no a priori knowledge for the cell type of interest is needed.

Instead differing cell types, cells cycles states, activations states etc. may be reliably characterized, identified and potentially sorted for downstream analysis or scale-up.

In a preferred embodiment the processing unit comprises an (analog-to-digital converter) ADC and a (preferably dedicated) digital signal processing unit (DSP) or a field programmable gate array (FPGA), wherein the waveforms are generated from the detected radiated light using the ADC and the waveforms are transformed using a DSP or FPGA.

The embodiment of using a hardware assisted transformation of the waveforms by means of a DSP or FPGA allows advantageously for a real-time analysis of the particles, which is particular useful for sorting applications.

Herein, the waveforms for each event may be transformed in real-time by a DSP or FPGA, according to the mathematical transformations described herein. The hardware electronics of the system may therefore provide real-time waveform coefficients characterizing the waveforms.

As described above, in preferred embodiments statistical methods may be employed on measurements for sampling or calibration particles to derive at a characteristic set of coefficients representing a desired property of a particle.

After having identified such coefficients, the set of coefficients and their respective ranges may be provided to the DSP or FPGA to allow for a real-time sorting.

In preferred embodiments the DSP or FPGA thus does not only allow for a transformation of waveforms to provide for the one or more coefficients representing the waveform, but in addition for a comparison to previously identified sets and/or ranges of coefficients that are characteristic for a certain desired particle property.

Since the mathematical operations for the waveform transformation to derive coefficients for a particle and the comparison to previously identified ranges for coefficients representing a desired particle property are computationally not intensive, such a hardware implementation enables a real time label-free sorting of cells. Instead of relying on particular fluorescent markers, the method advantageously allows for a sorting based on the information contained in the angular and time-dependent radiation pattern of said particles, which may take into the morphology, size, shape, granularity, refractive index or other properties of the particles.

BRIEF DESCRIPTION OF THE DRAWINGS

The invention is further described by the following figures. These are not intended to limit the scope of the invention, but represent preferred embodiments of aspects of the invention provided for greater illustration of the invention described herein.

BRIEF DESCRIPTION OF THE FIGURES

Figure 1:
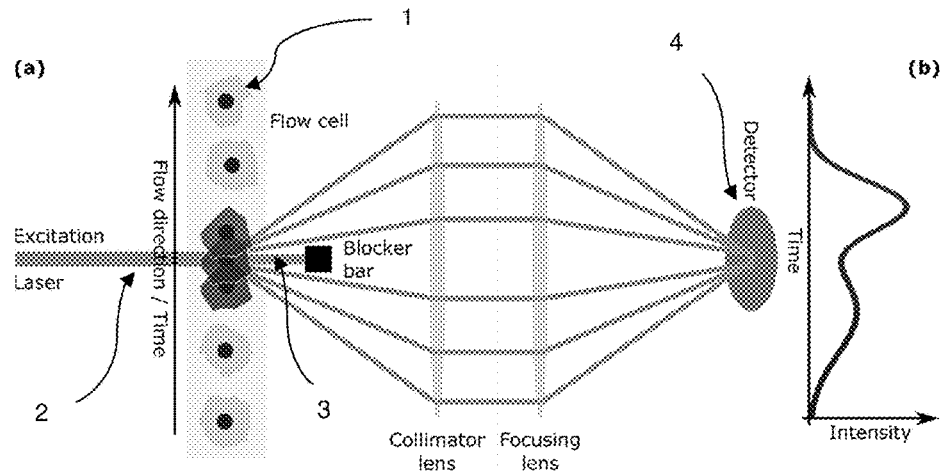

FIG. 1: Standard forward scatter detection in a flow cytometer. (a) Schematic drawing of the optical setup. One detector is used which integrates over a fixed range of solid angles thereby loosing angular resolution. (b) Time-dependent scattered light intensity (pulse shape).

Figure 2:
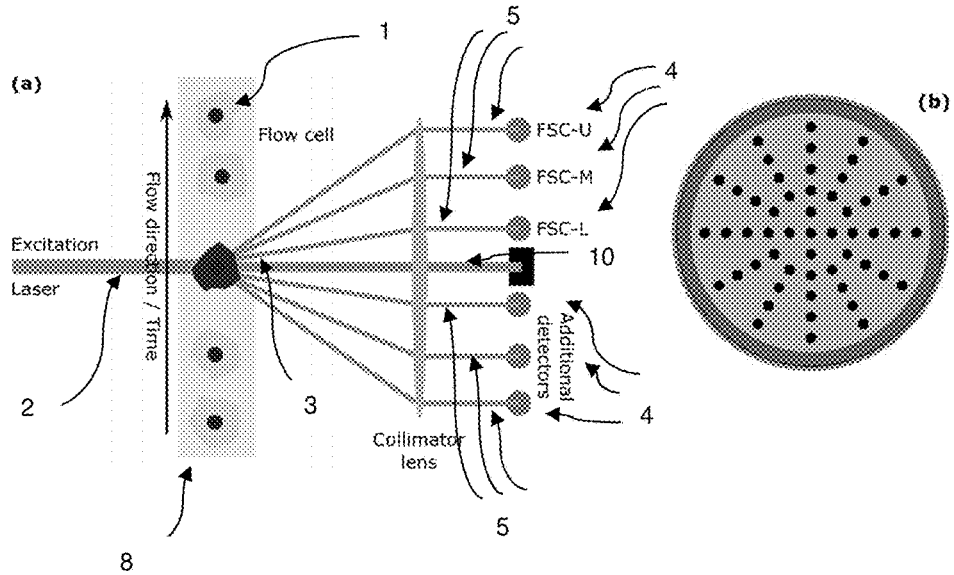

FIG. 2: Schematic drawing of the measurement setup with multiple FSC detectors and the detector arrangement. (a) Side view of the flow cell with a simplified representation of the optical setup and the detectors. Directly transmitted, not scattered light can either be measured or blocked as indicated in the Figure. The labeling of the upper detectors represents a setup with three detectors. (b) Front view of a detector arrangement for multiple forward scatter detectors.

Figure 3:
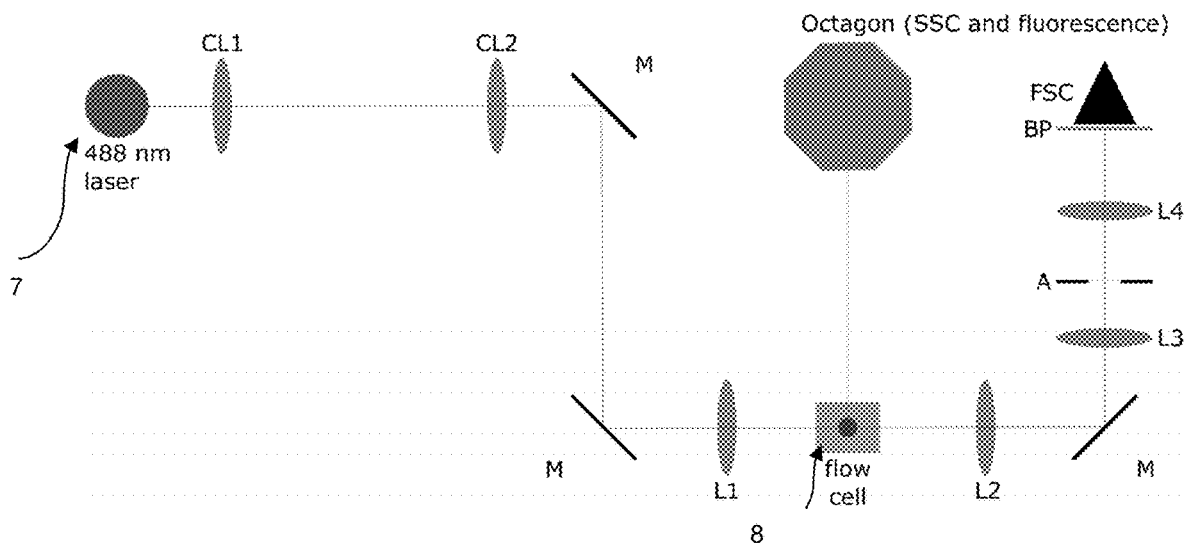

FIG. 3: Schematic drawing of the setup of the modified LSR II. The beam shaping optics were replaced with a telescope with cylindrical lenses. The flow cell and SSC/ fluorescence detection channel optics were kept from the original setup. For the FSC channel, a collimating lens is followed by a spatial filter in an arrangement similar to a confocal microscope. Details on the optical elements can be found in Table 1.

Figure 4:
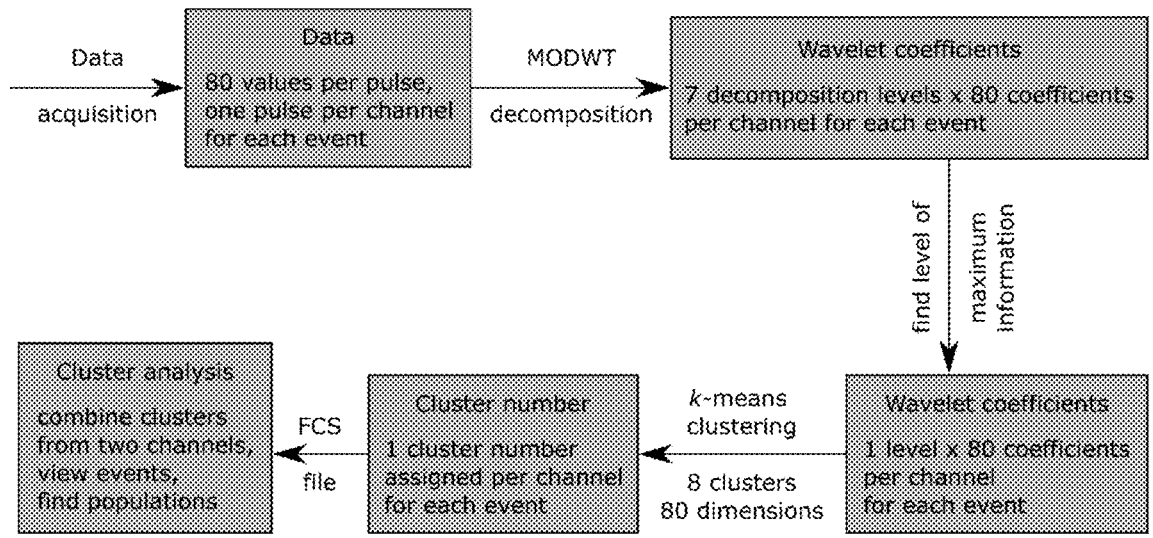

FIG. 4: Flow chart of a preferred data analysis procedure.

Figure 5:
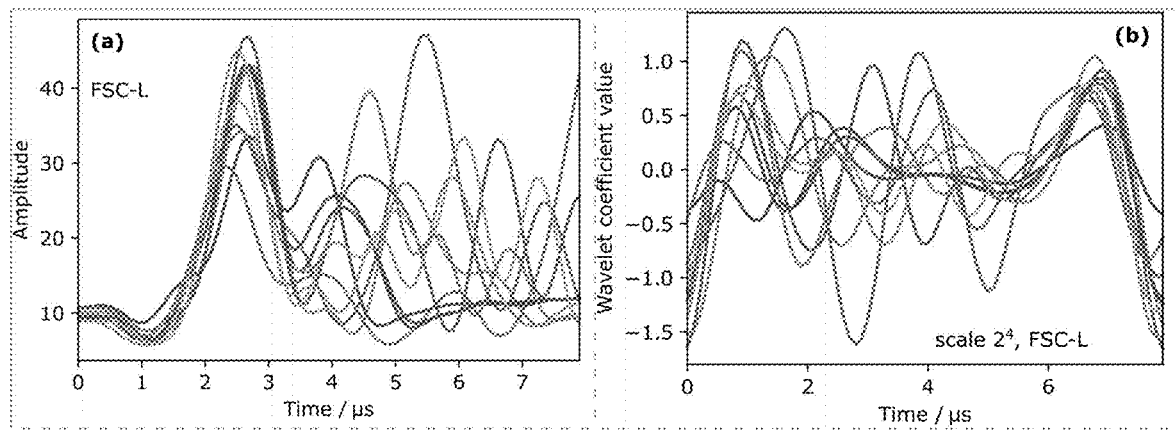

FIG. 5: Example of a maximum overlap discrete wavelet transform. (a) Randomly chosen pulse shapes from HCT116 cells in the FSC-L detector. (b) MODWT coefficients of these pulse shapes at the 4th decomposition level (scale $2^4$).

Figure 6:
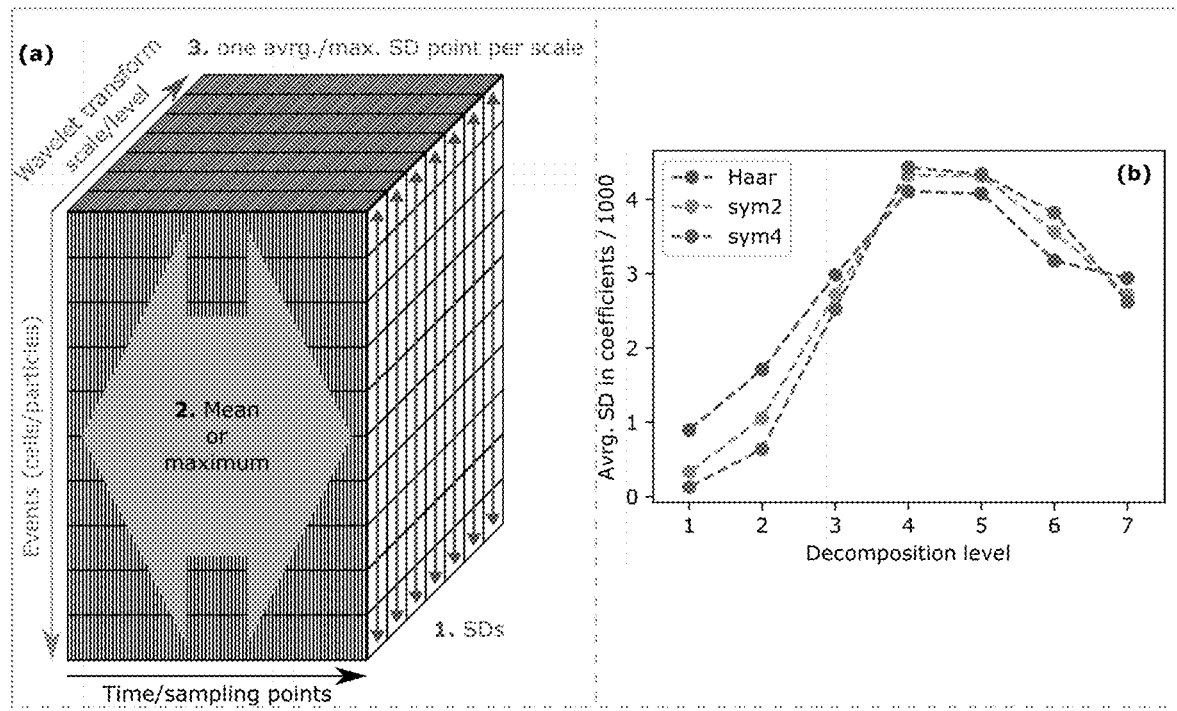

FIG. 6: Determination of the most suitable wavelet decomposition level. (a) Illustration of the data set obtained upon wavelet transform of 10 pulse shapes with 80 sampling points each. Every block represents one wavelet coefficient. First, the standard deviation (SD) across the 10 measurements is calculated for each wavelet coefficient. Then, the maximum or average of the SD is calculated across all sampling points. The result is one value per decomposition level. (b) Variation in each decomposition level for three different mother wavelets.

Figure 7:
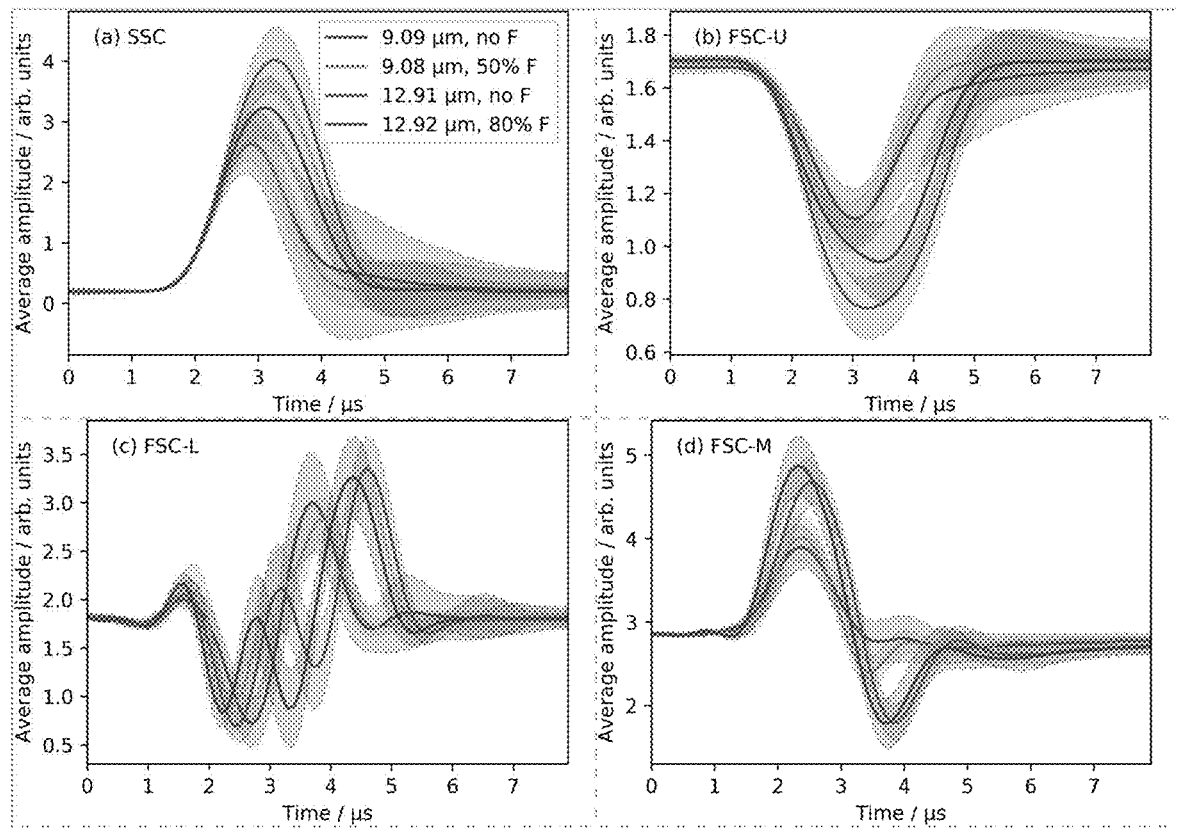

FIG. 7: Pulse shapes of scattered light from four polymer bead samples with two sizes and varying refractive indices (cf. Tab. 2). The curves show the mean pulse shapes from 20000 individual beads from each sample and the shaded areas represent the standard deviation. (a) SSC, (b) FSC-U, (c) FSC-L, (d) FSC-M.

Figure 8:
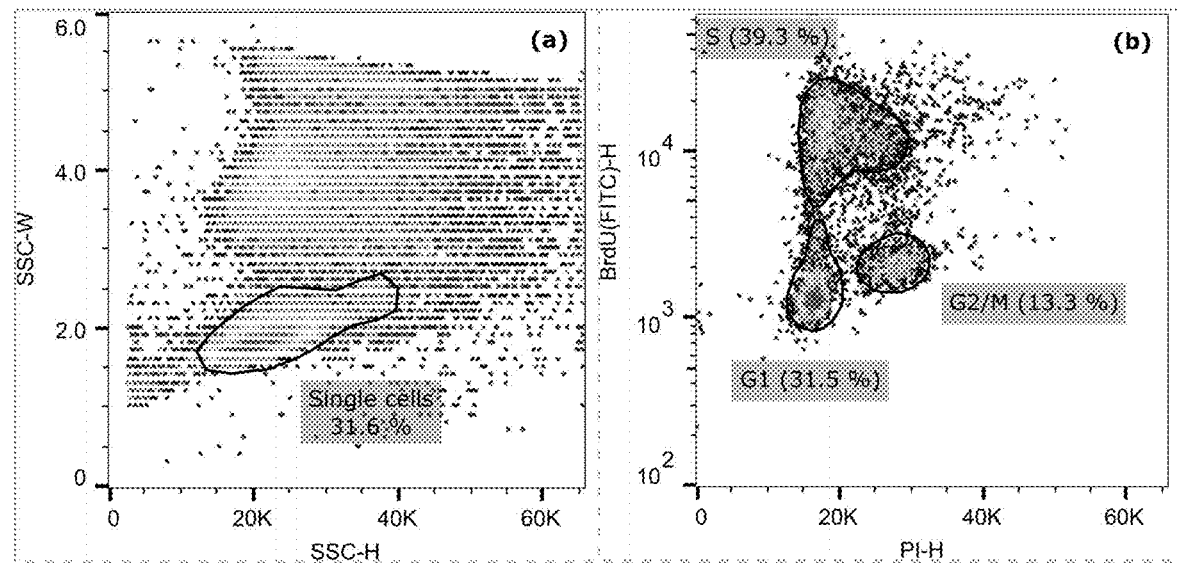

FIG. 8: Data from HCT cells. (a) SSC height-width pseudocolor plot for standard single cell gating. (b) Fluorescence intensity pseudocolor plot for PI and BrdU-FITC. The populations are assigned to the phases of the cell cycle as indicated.

Figure 9:
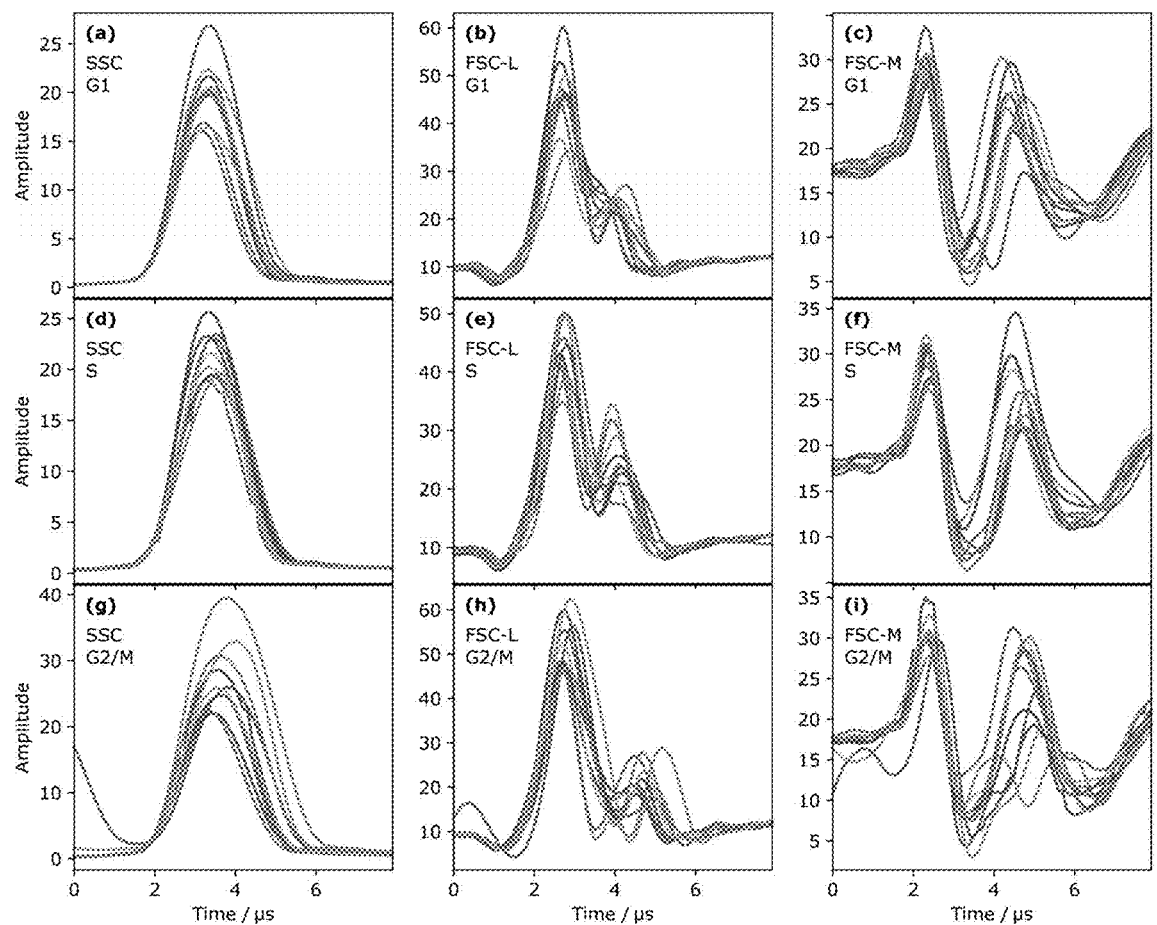

FIG. 9: Exemplary pulse shapes for SSC, FSC-L, and FSC-M for the three cell cycle phases G1, S, and G2/M. Each row corresponds to one phase of the cell cycle. Each column corresponds to one detector: SSC (a,d,g), FSC-L (b,e,h), FSC-M (c,f,i), G1 (a-c), S (d-f), G2/M (g-i).

Figure 10:
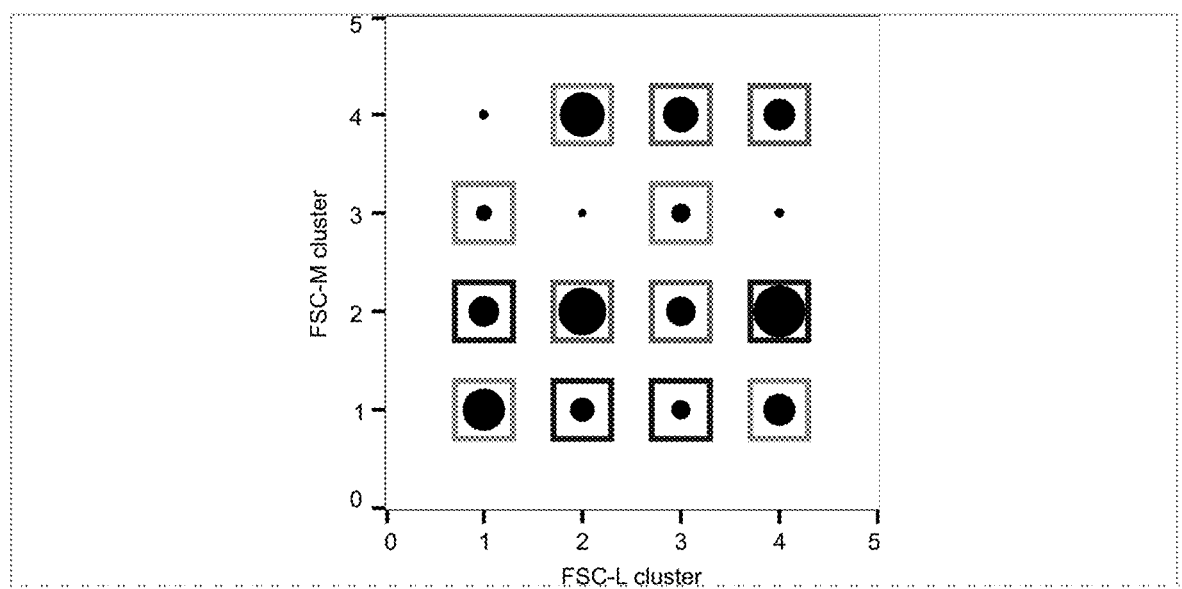

FIG. 10: Discrete 2-D histogram of the number of events in the wavelet-clusters. The cluster numbers assigned to the events in two channels, FSC-L and FSC-M, are used. Four clusters were defined in each channel. The colored boxes indicate clusters that are assigned to the same populations (light blue: G1, red: G1+S, green: S+G2/M, blue: all phases, orange: undefined events).

Figure 11:
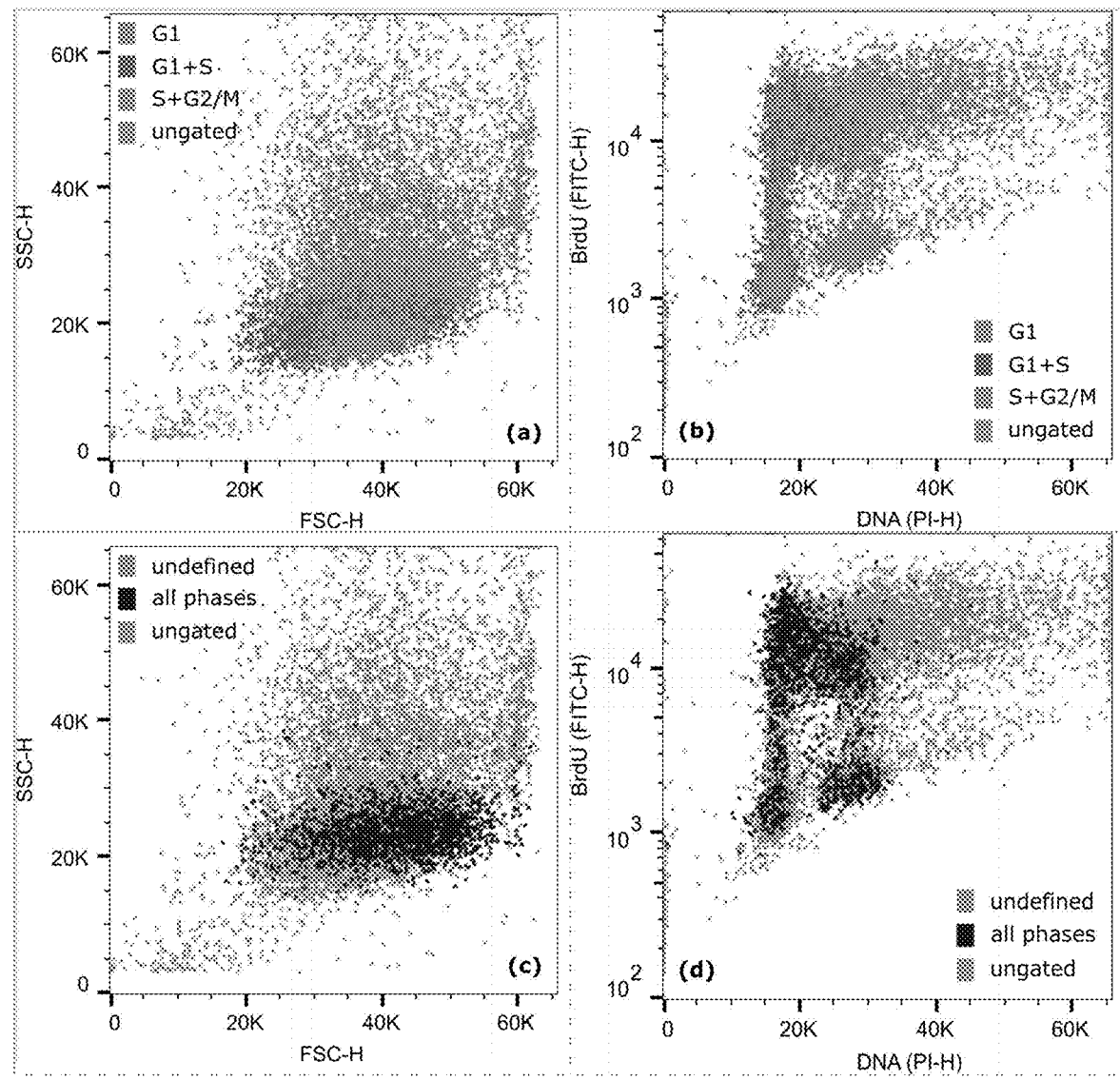

FIG. 11: Light scatter and fluorescence intensity dotplots of different subsets found by the wavelet-cluster approach. The colors match those of the boxes in FIG. 10. (a) and (b) FSC-SSC height and fluorescence intensity dotplots of events from clusters associated with certain cell cycle phases. (c) and (d) FSC-SSC height and fluorescence intensity dotplots of events from cluster that could not be associated with certain phases of the cell cycle.

Figure 12:
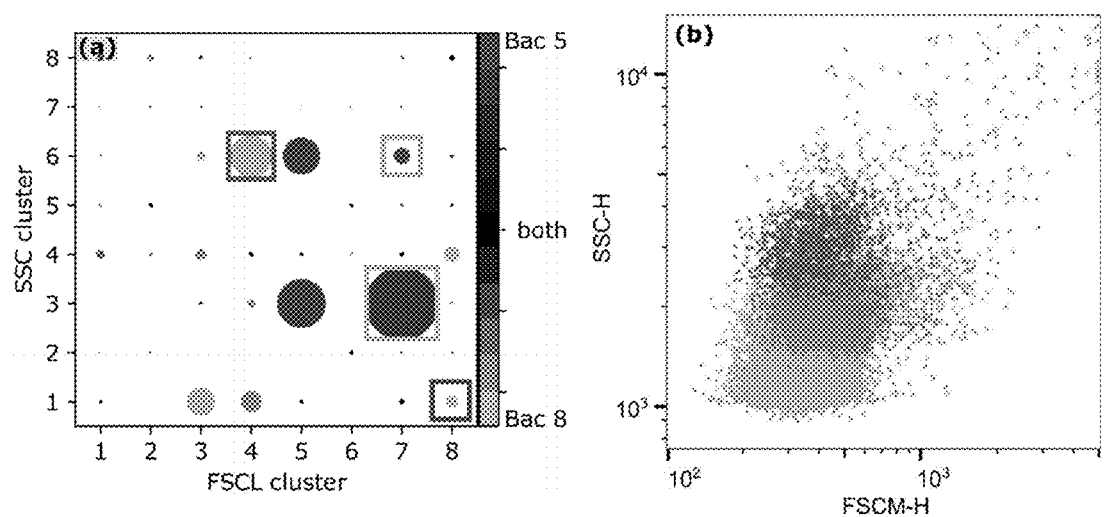

FIG. 12: Analysis of a data file merged from two measurements of different bacteria strains. (a) Plot of the cluster sizes (indicated by the marker size) and the enrichment with one of the bacteria strains (indicated by the marker color). Four major clusters with distinctive enrichment are highlighted. (b) Standard overlay dotplot of scattered light as it would be obtained with state-of-the-art instruments showing the events within the highlighted clusters. The events could not be distinguished with this representation. However, the events are specifically separated into different clusters.

DETAILED DESCRIPTION OF THE INVENTION

To provide a more detailed description of the present invention, the following preferred embodiments are discussed below.

With reference to the schematics of FIGS. 1 and 2 embodiments for detecting radiated of particles passing through a flow cytometer are described.

FIG. 1 illustrates the detection for standard forward scattering detection in a flow cytometer. In standard flow cytometers, the light scattered from a particle in forward direction is focused onto a single detector (FIG. 1a)). To this end a collimator lens and focusing lens may be used to guide a wider angular spectrum for the forward radiated light onto said detector. By such setups angular resolution is typically not provided and valuable information is lost.

Even though standard instruments commonly measure the time-dependent intensity curve of the scattered light as depicted in FIG. 1(b), the signal available to the user is usually reduced to height, area, and width (H, A, W) of the pulse shape. These parameters are stored as discrete values and used, for example, to distinguish cell duplicates from single cells. In standard flow cytometry assays no further analysis is carried out and the pulse shape characteristic is discarded.

FIG. 2 depicts a preferred multi-angular detection approach according to the invention for a forward scattering detection. In order to increase the amount of available information per measured cell/particle, multiple FSC detectors are used.

A schematic side view of an optical setup including the detectors is shown in FIG. 2a. The arrangement of multiple detectors vertically to the propagation of the excitation beam (parallel to the flow direction) allows for detection of scattered light with angular resolution.

A preferred setup comprises three detectors that are positioned above the directly transmitted laser spot, labeled FSC-L, FSC-M, and FSC-U in FIG. 2a. The directly transmitted light (centered detector) or additional detectors positioned symmetrically below may also be used. The number of detectors can be increased and the positioning can be varied to increase the specificity.

In this regard, a further preferred arrangement of multiple detectors covering a multitude of scattering angles is displayed in FIG. 2b. The two-dimensional detector array comprises optical fibers connected to photo multiplier tubes (PMTs) or of other light detectors such as photodiodes, APDs (avalanche photodiodes), or SiPMs (silicon-photomultipliers). As shown in FIG. 2b, a detector array comprising up to 54 individual fibers may be provided.

The invention combines a multi-angular detection approach with a time-dependent analysis of each of the waveforms detected at the different detectors.

In a typical flow cytometer, fluorescently stained or unstained cells pass through a laser beam and the respective emitted or scattered light (e.g. in forward or side scatter direction) is focused onto a light detector (e.g. photo multiplier tube). A current pulse is generated at the detector for each event, and the pulse is summarized by its height, area, and width in a standard flow cytometer, with no access to the raw readout of the detectors.

The present invention utilizes a multi-angular detection scheme in addition to analyzing the shape of the time-dependent waveforms to allow for a more precise characterization of the particles.

The present invention therefore relates to a method and system that are able to measure the particle specific pulse shape (i.e. waveform) based on the detector readout for multiple detectors thus reflecting a three-dimensional time-dependent radiation pattern.

Distinguishing features of the shape of the waveforms are captured by coefficients of a waveform transformation, preferably, a wavelet transformation. The more comprehensive approach allows for improved data quality in regard to discriminating singlet/doublet, dead cells, debris and high sensitivity towards biological properties (distinction of cell types, cell cycle states, morphology, granularity, (surface) protein expression etc.).

A wide variety of different types of samples can be analyzed by the flow cytometer. Several examples of types of samples include blood, semen, sputum, interstitial fluid, cerebrospinal fluid, cell culture, seawater, and drinking water. The sample may be in the form of a prepared sample, such as lysed blood, labeled particles in suspension, immunoglobulin-labeled cells, or DNA-stained cells, achieved commonly by adding reagents and performing protocols as commonly known in the art.

Examples of types of particles include beads, blood cells, sperm cells, epithelial cells, cancer cells, immune cells, viruses, bacteria, yeast, plankton, microparticles (e.g., from plasma membrane of cells), and mitochondria.

The sample source can include one or more containers, such as test tubes, that hold the sample to be analyzed. A fluid transfer system is provided in some embodiments, such as to aspirate the sample from the container and deliver the sample to the fluid nozzle or flow cell.

The sample is typically injected into a sheath fluid within the flow cytometer, which is provided by a sheath fluid source. An example of a sheath fluid is saline. An example of the fluid source is a container storing saline therein, and a fluid transfer system operable to deliver the sheath fluid from the fluid source to the fluid nozzle or flow cell.

In some embodiments a fluid nozzle is provided to generate the fluid stream and to inject the particles of the sample into the fluid stream. An example of a fluid nozzle is a flow cell. The flow cell typically includes an aperture having a size selected to at least be larger than the sizes of particles of interest in the sample, but small enough to arrange the particles into a narrow stream. Ideally the particles are arranged in a single file or near single file arrangement so that a single particle, or a small number of particles (e.g., 1-3), can be passed through the light beam at a time. In some embodiments the particles are focused using hydrodynamic, acoustic, or magnetic forces.

In preferred embodiments the flow cell is configured to generate a fluid stream comprising the particles sufficiently separated that that the particles individual through a detection location defined by the illumination beam and detection optics.

A light source (which can include one or more light sources) generates at least one light beam that is directed toward the fluid stream. Examples of light sources include a laser and an arc lamp. In some embodiments the light beam passes through an optics assembly, such as to focus the light beam onto the fluid stream. In some embodiments the light beam is a laser beam.

The light beam from the light source intersects the fluid stream. The particles contained in the light beam disturb the light beam and generate radiated light. The type and pattern of radiated light depends upon the type and size of the particles, but the radiated light can include forward scattered light, side scattered light, back scattered light, as well as fluorescent light (which occurs when light rays are absorbed and reemitted by the particle, which is detectable by the corresponding change in wavelength (i.e., colour) of the light rays).

Two or more detectors are provided to detect radiated light in two or more angular directions. For example, the detectors may include two or more detector arranged to detect forward scatter, side scatter and/or florescence in two or more angular directions. Examples of detectors include photo multiplier tubes (PMT), silicon-photo-multiplies (SiPMs), photodiodes or avalanche photo diode.

The system of the invention also preferably comprises a processing unit (or particle analyzer) that operates to receive signals from the one or more detectors to perform various operations to characterize and/or sort the particles.

In some embodiments, the processing unit or particle analyzer includes one or more processing devices and a computer-readable storage device that stores data instructions, which when executed by the processing device cause the processing device to perform one or more operations, such as those discussed herein. In some embodiments the system (preferably a particle analyzer) includes an analog to digital converter (ADC), a processing unit comprising a (preferably dedicated) digital signal processing unit (DSP) or a field programmable gate array (FPGA), and/or firmware.

Any time a relevant particle passes through the interrogation point (i.e. a detection location) and generates a signal a pulse is generated in every detector. These pulses reflect the passage of the cell through the excitation beam and the signal generated at each point in the cell's path emitted in the respective angular directions. Using a multi-angular approach for each angular direction the pulses can be mapped by plotting the signal as a function of time, thereby generating (time-dependent) waveforms.

The emitted scattered light and/or fluorescence signals of the particles passing the detection location, will ultimately manifest for instance in a time-dependent stream of electrons (current) at a PMT detector. The magnitude of the current is proportional to the number of photons that hit the photocathode and thus is also proportional to the intensity of the scatter or fluorescence signal generated by the particle.

As the particle enters the laser beam spot, the output of the (PMT) detector will begin to rise, typically reaching a peak output when the particle is located in the center of the laser beam. At this point, the particle is fully illuminated (the laser beam's photons are typically at highest density in the center of the laser beam) and will produce a maximum amount of optical signal. As the particle flows out of the laser beam, the current output of the PMT will drop back to baseline. This generation of a pulse may be termed an "event."

As the waveform for the different detectors are generated, their quantification is necessary for signals to be displayed, analyzed, and interpreted. This is conducted by the signal processing electronics.

The majority of flow cytometers and cell sorters are now digital systems, such that cytometers with ADC are suitable for carrying out the present invention. The analog current from a PMT (or a photodiode) is preferably transformed to a voltage and digitized or broken down into very small slices by the analog to digital converter (ADC). This process may be referred to as "sampling." A sample of a pulse captures the signal at an instant in time and stores it as a digital value. Together these samples represent the entire pulse and optical signal from the particle. The digital representation of the pulse is referred to as a waveform and thus comprises the information of the sampling.

The electronics of systems of the prior art typically quantify the pulse by calculating its height, area, and width. The height and area, or maximum and integral, respectively, are used to measure signal intensity because their magnitudes are proportional to the number of photons that interacted with the PMT. The width, on the other hand, is proportional to the time that the particle spent in the laser beam and can be used to distinguish doublets (that is, two particles that pass through the laser so closely that the system assigned both of them to a single pulse and event) from singlets. The measurement from each detector is referred to as a parameter. Each parameter can be displayed in height, area, and width values on the histograms and dot plots in flow cytometry software. These are used to measure fluorescence intensity, compare populations, and designate sorting decisions.

According to the present invention, radiated light is detected in two or more angular directions as one of the one or more particles pass through the light beam, and subsequently waveforms, which are a digital representation of the detected radiated light, are generated for each angular directions, and said waveforms are transformed using one or more basis functions and obtaining one or more coefficients characterizing the waveform. The digital signal therefore is a waveform for each event, which is transformed, preferably by a particle analyzer or processing unit, preferably comprising a (preferably dedicated) digital signal processing unit (DSP) or a field programmable gate array (FPGA), according to the mathematical transformations described herein. The electronics of the system therefore provide coefficients that represent the waveform in abstracted form, from which a very accurate representation of the waveform can be constructed, if so desired.

In preferred embodiments of the invention reconstruction of the actual waveform is however unnecessary for analysis. In preferred embodiments the coefficients of an analyzed particle from any given event is compared to a set of control or calibration coefficients in order to characterize the measured particle. In this way, by the use of appropriate calibration samples and the determination of control coefficients for each of the particular artefacts or desired outcomes of the analysis, the method can be conducted in an automated manner based on categorizing the coefficients of each event/pulse.

In some embodiments the coefficients characterizing the waveforms can then be assessed using a multivariate statistical model, such as a cluster or principal component analysis. The statistical approach preferably allows to identify a decisive set of waveform coefficients that characterize the temporal and spatial radiation pattern of the particles of interest. The set of coefficients may thus act as a characteristic spectral fingerprint, which can be used for characterizing the particles or subsequently sorting said particles based by comparing a defined range for the set of coefficients to coefficients determined for unknown particles.

In some embodiment the analog-to-digital conversion that provides the waveform as well as a transformation of the waveforms may be hardware implemented onto a (preferably dedicated) digital signal processing unit (DSP) or a field programmable array (FPGA) to allow for a particular fast processing, while other computational aspects such as a statistical analysis of coefficients for instance for a calibration sample may be performed on a separate processing unit, e.g. as part of a computer.

The method, system, or other computer implemented aspects of the invention may in some embodiments comprise and/or employ one or more conventional computing devices having a processor, an input device such as a keyboard or mouse, memory such as a hard drive and volatile or non-volatile memory, and computer code (software) for the functioning of the invention.

The system may comprise one or more conventional computing devices that are pre-loaded with the required computer code or software, or it may comprise customdesigned software and/or hardware. The system may comprise multiple computing devices which perform the steps of the invention.

A computer can have its own processor, input means such as a keyboard, mouse, or touchscreen, and memory, or it may be a terminal which does not have its own independent processing capabilities, but relies on the computational resources of another computer, such as a server, to which it is connected or networked.

The components of the computer system for carrying out the method may be conventional, although the system may be custom-configured for each particular implementation. The computer implemented method steps or system may run on any particular architecture, for example, personal/microcomputer, minicomputer, or mainframe systems. Exemplary operating systems include Apple Mac OS X and iOS, Microsoft Windows, and UNIX/Linux; SPARC, POWER and Itanium-based systems; and z/Architecture. The computer code to perform the invention may be written in any programming language or model-based development environment, such as but not limited to C/C++, C#, Objective-C, Java, Basic/VisualBasic, MATLAB, R, Simulink, StateFlow, Lab View, or assembler. The computer code may comprise subroutines which are written in a proprietary computer language which is specific to the manufacturer of a circuit board, controller, or other computer hardware component used in conjunction with the invention.

The information processed and/or produced by the method, i.e. the waveforms as digital representations of the detected radiated light or waveform coefficients derive thereof can employ any kind of file format which is used in the industry. For example, the digital representations can be stored in a proprietary format, DXF format, XML format, or other format for use by the invention. Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, cloud storage or a magnetic storage device.

A statistical analysis of the data is preferably performed on conventional computing devices, which may include a graphical user interface to aid the data analysis. Some computational aspects of the invention, in particular relating to a waveform transformation and/or sorting based upon coefficients derived from such transformation may however be implemented in customized integrated circuits to ensure fast processing. In a preferred embodiment the system comprises a (preferably dedicated) digital signal processing unit (DSP) or a field-programmable gate array (FPGA) to this end.

Field programmable gate arrays (FPGA) are commonly used in many applications that require complex logic functions. In general, FPGAs are comprised of logic heads (also referred to as cells) arranged in a repeating manner and interconnect structures that route signals between the various cells. There are many different types of FPGA architectures that are commercially available from vendors such as Xilinx, Altera, Actel, Lattice Semiconductor, QuickLogic, and others. A FPGA is thus preferably an integrated circuit designed to be configured by a customer or a designer after manufacturing. The FPGA configuration may be generally specified using a hardware description language (HDL), similar to that used for an application-specific integrated circuit (ASIC).

Typical FPGAs contain an array of programmable logic blocks, and a hierarchy of "reconfigurable interconnects" that allow the blocks to be wired together, like logic gates that can be inter-wired in different configurations. Logic blocks can be configured to perform complex combinational functions, or merely simple logic gates like AND and XOR. The logic blocks may include memory elements, which may be simple flip-flops or more complete blocks of memory. Preferred FPGAs can be reprogrammed to implement different logic functions, allowing flexible reconfigurable computing as performed in computer software.

Due to the possibility of a "field programming" an FPGA has a number of advantages in the context of the invention in allowing for an adaption of the FPGA to the specific applications. However, also other types of integrated circuits, such as an application-specific integrated circuit (ASIC) may be used.

EXAMPLES

The invention is further described by the following examples. These are not intended to limit the scope of the invention, but represent preferred embodiments of aspects of the invention provided for greater illustration of the invention described herein.

The following examples report on the use of multiple detectors in flow cytometry to allow for an angular resolution that is not available with a single angularly integrating detector as used in the prior art. Instead, the angular resolution provides a deeper insight into the optical properties of the objects under investigation. In combination with time-resolved detection of the scattered light intensity, pulse shapes corresponding to different scattering angles are obtained. These pulse shapes may be decomposed by waveform transformation, e.g., a wavelet analysis, to extract features of the pulse shapes characteristic for certain optical properties of the measured objects. A subsequent statistical analysis, e.g., using a clustering algorithm or principle component analysis, provides a dimensionality reduction and allows to group events based on their pulse shape characteristics. Thereby sets of coefficients may be defined that allow for reliable label-free characterization of cells in regards to cell type, cycle state, activation or other biological properties.

The approach described in the examples does not only open new possibilities for an improved analysis and characterization of analysis, but may be extended to a label-free cell sorting. Cell sorting without the need for fluorescent labels would greatly enhance the possibilities for research or medical applications using sorted living cells. Here the application of the method was described using cell cycle analysis and the distinction of bacteria strains. In addition, the approach described can be applied to all flow cytometric measurements and potentially used for marker free cell analysis and sorting.

Materials and Methods Used in the Examples:

In the examples reported herein, angle-dependent forward and sideward light scattering is used for a label-free measurement of three cell lines (measurement of cell proliferation), B-cell subsets of PBMCs (measurement of activation), and bacteria from culture. All cytometric measurements were performed on a modified LSRII (Becton Dickinson). As the original signal processing electronics and optics do not provide the possibility to perform time- and angle-dependent measurements of the FSC signal some modifications were necessary:

The original signal processing has been replaced by custom-made electronics (APE Angewandte Physik & Elektronik GmbH, Berlin) to acquire time-dependent signals i.e. pulse shapes. Further, the FSC detector diode was replaced by an optical fiber array connected to PMTs allowing the angle-dependent detection of forward scattered light. The data analysis is based on wavelet transforms of the acquired pulse shapes and subsequent k-means clustering on wavelet coefficients as described in more detail in the following section.

Theory

Wavelet Transformation

Generally, wavelets are a mathematical tool for (digital) signal analysis. A wavelet is a wave-like oscillation with an amplitude, such that the area under the curve integrates to zero and must decay rapidly (i.e. it is localized). Wavelets are used to extract features from many different kinds of data, such as audio or light signals. Similar to Fourier transforms they can be considered as data transformation in function space to a different domain. This allows the reduction of the data information into fewer dimensions. In contrast to the Fourier transformation, the wavelet transformation projects signals onto basis functions (wavelets) instead of sine and cosine functions. Fourier analysis is generally well suited for periodic signals. However, in a flow cytometer the pulses are generated within a certain trigger window. Therefore, the cell-related high-frequency component of the pulse can be considered as localized within the trigger window and is therefore particularly suitable for wavelet analysis. In other words, the basic function of a Fourier transform is infinitely extended and provides information about which frequencies occur in a signal, but not at what time. In contrast, wavelet transformation provides information about time and frequency of a signal. This allows for a more reliable detection and assignment of cell or particle properties.

Wavelet transformation is divided into continuous wavelet transform (CWT), which has its main application in mathematics, and discrete wavelet transform (DWT) which is used in engineering and applications lie in data reduction. In this report the DWT was used for all transformations as it is computationally efficient. In general, frequencies contained in the signal are detected by stretching or compressing (scaling) the wavelets. The time shift (translation) of the wavelet gives information about when the signal occurs. Scaling and translation are the basic function of a wavelet. Mathematically it can be expressed as follows:

$$\psi_{jk} = 2^{\frac{j}{2}} \psi(2^j x - k)$$

If f(x) is the function to be decomposed, the wavelet coefficients are found by $$d_{jk} = \int_{-\infty}^{\infty} f(x) \psi_{jk}(x) dx.$$

The transformed signal provides information about the time and frequency of the analyzed signal, which is presented in different levels. The wavelet coefficient levels containing the most representative frequency components must be found by appropriate methods. Here, we measured the standard deviation (SD) of each level and chose the level containing the highest SD. The resulting wavelet coefficients can be further summarized by suitable statistical tools such as PCA (principal component analysis) or clustering. Both methods enable the identification of populations of cells or particles that share a common property of the wavelet coefficients. In short, this approach is used to determine the specific frequency components of a pulse and the time associated with those frequencies. Both parameters are then grouped by clustering.

Multiple FSC Detectors

The use of multiple detectors for the acquisition of FSC signals enables a more precise determination of cell-specific parameters. It has been proposed that different scattering processes (diffraction, refraction, reflection) dominate the intensity of the scattered light in different angles Cunningham et al. 1992). As a consequence, also properties of cells and other objects may be represented by scattering at different angles and directions (Salzman et al. 1982, Sharpless et al 1977). Object size information is typically contained in small-angle scattering, while shape information is found at larger angles Cunningham et al. 1992. Multi-angular scattering of cells and particles encodes significant information of their biochemical structure and morphological properties. Thus, information about cell morphology and other optical properties will be lost with insufficient angular resolution (Kaye et al. 1992). Thus, a single forward scatter detector as it is used in standard flow cytometers will average out useful information by angular integration.

Instead as proposed herein a multi-angular detection approach is combined with a time-dependent analysis of the waveforms to derive coefficients that allow for a label-free characterization or sorting of the cells.

Optical Setup

In the original LSR II arrangement, a beam shaping optics focusses the laser light into the flow cell. Side scattered light (SSC) and fluorescence are detected at an angle of 90° with respect to the incident laser light. An optical fiber is used to transmit the SSC light and the fluorescence signal to a so-called octagon with multiple PMTs and respective optical filters. Forward scattered light (FSC) is measured over an angle of 2-20° along the direction of the incident light. The light is focused onto a photodiode detector. A blocker bar is placed in front of this FSC light detector to block the axially illuminating laser beam. Further, the optical FSC arrangement consists of an aperture in order to reduce background light.

The original optical setup of the LSR was replaced by a new optical arrangement depicted in FIG. 3.

For excitation beam shaping, a telescope-like assembly of two cylindrical lenses (CL1 & 2) is used to create an elliptical vertically elongated beam cross section. The beam is focused into the flow cell with a spherical achromatic compound lens. This provides a horizontally stretched elliptical focal spot with a smaller spot size than in the original optics. The SSC/fluorescence detection optics were not modified. For FSC detection, the modified setup is similar to a confocal microscope to increase the optical resolution and reduce background light. The arrangement consists of three lenses L1-3 and an aperture A (pinhole d=100 μm or slit w=50 μm). The specifications of the optical elements are summarized in Table 1.

TABLE 1

Specifications of the optical elements used
in the modified setup (cf. FIG. 3).

| Optical element | | Description |
|---|---|---|
| CL1 | Cylindrical lens | f = 50 mm |
| CL2 | Cylindrical lens | f = 300 mm |
| M | Mirror | |
| L1 | Focus lens | spherical achromatic compound lens |
| L1-4 | Spherical lenses | f = 50 mm |
| A | Aperture | d = 100 µm or w = 50 µm |
| BP | Band pass filter | 488/10 nm |

TABLE 1

Identification numbers of the fibers in the array with their respective angular ranges. The three fibers used for the presented cell cycle analysis are fibers number 4 (FSC-L), 3 (FSC-M), and 2 (FSC-U).

| Region | | Center (vers. I) | Width (vers.) | Center (vers. II) | Width (vers. II) | Fibers |
|---|---|---|---|---|---|---|
| | | center | 0° | 1.15° | 0° | 1.15° | 6 |
| 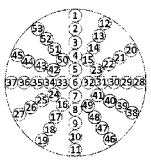 | | first ring | 2.29° | 1.14° | 1.72° | 1.14° | 5, 32, 7, 33 |
| | | (4-point) second ring (first full 12) | 4.57° | 1.14° | 3.43° | 1.14° | 4, 15, 23, 31, 41, 49, 8, 16, 24, 34, 42, 50 |
| | | third ring | 6.84° | 1.13° | 5.14° | 1.14° | 3, 14, 22, 30, 40, 48, 9, 17, 25, 35, 43, 51 |
| | | fourth ring | 9.09° | 1.12° | 6.84° | 1.13° | 2, 13, 21, 29, 39, 47, 10, 18, 26, 36, 44, 52 |
| | | fifth ring (outer) | 11.31° | 1.10° | 8.53° | 1.12° | 1, 12, 20, 28, 38, 46, 11, 19, 27, 37, 45, 53 |

In addition, the single photodiode for FSC detection has been replaced by an array of 53 optical fibers connected to photomultiplier tubes (PMTs). A simplified side view is shown in FIG. 2. The angular position of the fibers and their respective widths are listed in Table 2. In the experiments two versions of such a bundled fiber are used. For distinction of bacteria strain vers. II is preferably used. The three detectors provide angular resolution of 1-2° with an angular spacing between individual fibers in the same order. For each detector, a separate pulse shape is acquired. This increases the amount of information obtained for each cell or particle.

Signal Processing

The original signal processing electronics were replaced by custom-made amplifiers and digitizers (APE). The electronics provides eight detection channels with linear analog amplifiers suitable for photodiodes and PMTs. One of the channels is chosen to be the trigger for data acquisition. In contrast to most standard flow cytometers, the SSC channel is used as the trigger channel. The analog signals are digitized at a sampling rate of 10 MHz providing a time resolution of 0.1 µs. The pulse shapes are recorded within a certain time window of 8 µs around the trigger point and are stored in a binary file format with 16 bit resolution. Simultaneously, a standard FCS 3.0 format file with typical height, area, and width information for each event is generated.

Sample Preparation and Analysis

Cell Culture of Cell Lines

HCT116 cells were grown in Dulbecco modified Eagle's medium (DMEM), HEK293 cells were grown in DMEM and Jurkat cells were maintained in RPMI 1640 medium, supplied with 10% fetal bovine serum (FBS) and 2 mM L-Glutamine at 37° C. and 5% $CO_2$.

BrdU Treatment

Twenty-four hours prior to the experiment, cells were seeded in appropriate density, so that cells should not be confluent at the time of harvest. Cells were treated with 60 µM BrdU in cell culture medium for 1 hour. Adherent cells (HEK293, HCT116) were detached by trypsinization.

Cell Fixation and Staining for Cell Cycle Analysis

After washing the cells once with PBS, cell pellets were resuspended in PBS and 70% ice cold ethanol were added in a drop wise manner while vortexing. Cells were incubated for at least 1 hour at 4° C. After fixation, cells were centrifuged and washed once in PBS. Cells were treated first with 2 M HCl/0.5% Triton X-100 for 30 min at room temperature, after centrifugation cells were resuspended in $Na_2B_4O_7$ for 2 min at room temperature. After washing the cells once in PBS/1% BSA, cells were resuspended in PBS/1% BSA/0.5% TWEEN 20 and labeled with anti BrdU-FITC antibody for 1 hour. For PI staining cells were treated with PI staining solution (PBS containing 50 µg/ml PI, 100 µg/ml RNase A, 2 mM $MgCl_2$) for 20 min at room temperature (Darzynkiewicz et al. 2017).

Cell Cycle Analysis by Flow Cytometry

Sorting was performed with a cell sorter. PI fluorescence was collected through a 670/30 bandpass filter and displayed on linear scale. Additionally, BrdU-FITC fluorescence was collected through a 530/30 bandpass filter and displayed on log scale. For cell cycle distributions, gates were set on a SSC-width vs. SSC-height plot to exclude cell aggregates. Cells were sorted into several compartments of the cell cycle (G1/G0, S and G2/M phase) based on PI and BrdU staining intensity. After sorting, the different compartments of cell cycle and a control (unsorted cells) were analysed on the modified LSR II to detect specific pulse shapes of the different cell cycle compartments.

For verification, cells were arrested in the G2/M phase without fixation and then measured in the arrested state as well as in a time series after the removal of the blocking reagent. An untreated control sample was used to define wavelet-clusters. For the samples measured in the arrested state and at different time points after block removal, the events were assigned to the wavelet-clusters defined by the control sample instead of creating new cluster centroids. Then, the size of the clusters was tracked over time, i.e. across the different samples. The cluster size showed a clear fingerprint that allowed to assign the clusters to the G2/M phase or the other phases. Thus, the cell cycle characterization based on pulse shape analysis with angular resolution also works for live cells.

Bacteria Sample Preparation

Two bacteria strains (CFU5: *Staphylococcus epidermis*, CFU8: *Lactobacillus plantarum*) were used. CFU5 was cultured in LB medium, CFU8 was cultured in BHI medium supplemented with yeast extract and hemin/menandion. Cultures were inoculated from overnight cultures at an optical density at 600 nm of 0.1. Samples were harvested after 24 h and frozen at an optical density at 600 nm of 0.4 in 1 mL in LB medium with 25% glycerol. For fluorescent staining, an aliquot of 100 μL was taken and stained with SytoBC.

Data Analysis

Analysis of Cell Cycle Staining

All data analysis of the conventional data was performed using FlowJo 10.6.2 (Becton Dickinson).

Pulse Shape Analysis

Each pulse shape has 80 data points which makes data reduction necessary for classification of cells and graphic representation. Moreover, the important features for cell cycle analysis or other means of characterization need to be extracted from the pulse shapes. The approach for data analysis presented in the examples herein includes the following steps: a maximum overlap discrete wavelet transform (MODWT) of each pulse, followed by the determination of the most relevant decomposition level and subsequent k-means clustering. The procedure is summarized in FIG. 4.

The raw data acquired by the instrument contains one pulse shape for each channel and each event, i.e. each cell or particle. Each pulse shape has 80 data points (0.1 μs time resolution). In order to extract relevant information and remove noise and random features, a MODWT is applied to each pulse. The MODWT decomposes the signal into wavelet coefficients that distribute the information in the original curve onto different scales or levels. In the case of a MODWT, each level contains as many coefficients as there were data points in the original curve. For our data, we obtain 6 detail levels and 1 so-called approximation level. As an example, FIG. 5(a) shows pulse shapes obtained in the lower forward scatter (FSC-L) detector and FIG. 5(b) shows the respective wavelet coefficients on the 4th level.

To find a preferred decomposition level that carries information suitable for cell classification, the standard deviation of each wavelet coefficient was used across all measured events. Then, the standard deviation is averaged on each level. The most relevant level is determined by the largest variation, only forward scatter channels were considered. The other levels are discarded. This procedure is illustrated in FIG. 6(a). Imagine a measurement of 10 objects (light blue vertical direction) with 80 data points per pulse shape (black horizontal axis). The wavelet transform has 7 levels (green axis away from the image plane). Thus, each block in the schematic represents one wavelet coefficient. Now, the standard deviation of the coefficients at each sampling point are calculated across all events within each decomposition level (blue arrows, 1). This is a measure of the variation comprised by the coefficients in the respective level. Now, the mean or maximum over all coefficients in one level is calculated (large gray arrow, 2). As a consequence, one obtains a single value summarizing the amount of variation in each level (3). These values are plotted against the decomposition level in FIG. 6b for three different mother wavelet functions. In this case, the fourth and fifth decomposition level contain the most variation and are therefore considered suitable for feature extraction. The level of most variation is chosen, all other decomposition levels are discarded. An alternative approach to choose the decomposition level uses the average energy carried in each level. Here, the decomposition level with highest energy fraction is considered carrying most information. With one certain level chosen, still 80 wavelet coefficients per event and channel are remaining, cf FIG. 6b.

Each wavelet coefficient curve is now handled as an 80-dimensional vector. Thus, a wavelet coefficient curve for one event in one channel is a point in an 80-dimensional space. Events with similar wavelet coefficients will form groups separated from other groups with different similarities. To find these groups of events with similar wavelet coefficients and thus also similar pulse shapes, k-means clustering as a multivariate statistical model is applied to the wavelet coefficients in each channel. Thereby, each measured event is assigned to one cluster in each channel. Instead of k-means clustering, e.g. also a principal component (PCA) could have been employed.

Example 1—Polymer Beads of Different Diameters and Refractive Indices

The optical properties of cells are relatively complex and their light scattering behavior is difficult to predict. Therefore to demonstrate how multi-angle detection in FSC enhances measurements on cells, the improved sensitivity shall first be shown in a simple system. This simple system is a set of beads with two different bead diameters and two different indices of refraction. The properties of the four samples are summarized in Table 3:

TABLE 3

Properties of polymer beads with different sizes and refractive indices. The refractive indices are rough estimates on the basis of literature data (Zhou et al. 2008).

| Sample | Diameter | F content | n* | Staining |
| --- | --- | --- | --- | --- |
| Beads A | 9.09 μm | 0% | 1.49 | 'Orange 5' |
| Beads B | 9.08 μm | 50% | 1.44 | — |
| Beads C | 12.91 μm | 0% | 1.49 | 'Red 5 50' |
| Beads D | 12.92 μm | 80% | 1.41 | — |

Beads of different size are obviously distinguishable in standard FSC-SSC 'height' and 'width' signals. In the case of same size but different refractive indices, at least the width parameter does not contribute sufficient variation and the changes in the height signal might be too small as well. Therefore, populations would overlap. The same holds true for cells: if the cell populations in question differ strongly enough in morphology and size, they can be seen as separate subsets in standard light scatter plots (height, area, width in FSC and SSC). However, if the differences are small, discrimination is impossible. As demonstrated herein, multi-angle FSC detection of pulse shapes can help to increase resolution in such cases. To demonstrate this, the samples listed in Table 3 were measured the modified setup using a multi-angle FCS detection. Herein, light scatter in FSC is obtained at three different angles instead of integrating over a wide angular range (cf. FIG. 2).

FIG. 7 shows the average pulse shapes of the four bead samples measured in SSC and the three FSC detectors. The shaded range around each curve depicts the standard deviation of 20000 individual pulse shapes. From the SSC channel, FIG. 7(a), it is apparent that the pulse width and height might not vary with the refractive index in measurements with standard configuration.

Employing the three FSC detectors, more significant differences between pulse shapes of beads of the same size but different refractive indices are obtained. FIG. 7(c) shows the scattering into small angles close to the edge of the transmitted spot, the FSC-L channel. Here, striking differences between the beads of same size are visible: the positions and intensity ratios of peaks and valleys in the pulses change characteristically even between bead samples with the same nominal diameters. Similar effects with but less pronounced can be found in the FSC-M channel in FIG. 7(d). In contrast, scattering into larger angles as captured by the FSC-U detector and displayed in FIG. 7(b) does not carry such specific information. In fact, in this channel mostly extinction of background light was observed that would reach this detector, when no bead is present in the beam.

The obvious differences between the pulse shapes measured at different FSC angles make it clear that the common approach of integrating over a large spectral range leads to a critical loss in information and sensitivity. Consequently, the multi-angle detection may allow to provide a deeper insight into cell morphology beyond what a single detector would provide.

Example 2—HCT116 Cells-Single Cell Gating in SSC-H-W

Cells of the HCT116 cell line were prepared according to the description in the Materials and Methods Section.

A total of 20000 events was acquired with the modified flow cytometer setup. As a starting point and for comparison with the pulse shape analysis, first a standard gating and analysis on FCS data files is carried out. For exclusion of cell doublets, cell aggregates, and debris, a single cell gate is set in the SSC height-area pseudocolor plot as shown in FIG. 8(a). Subsequently, the events within this gate were analyzed by means of the DNA and BrdU staining. The respective plot is given in FIG. 8(b). The three populations can be assigned to the phases of the cell cycle as indicated in the Figure. For each of these populations, one can inspect the according pulse shapes in the scattered light detectors to get a first idea of similarities and differences.

Such exemplary pulse shapes are shown in FIG. 9. Each panel row corresponds to a phase in the cell cycle: G1, S, G2/M. Each column represents one detector: side scatter (SSC), lower forward scatter (FSC-L), mid forward scatter (FSC-M). Data from the upper forward scatter (FSC-U) detector is not shown since it exhibits strong correlation with FSC-M for the HCT116 cell line.

For the SSC signals, one can see that the pulse shapes do not differ much between the different cell cycle phases. Only the width of the pulses slightly increases with progression through the cell cycle. The pulse shapes acquired in FSC-L and FSC-M show slight but characteristic differences between the cell cycles. Namely, in FSC-L the ratio between the first local maximum and the following minimum varies. Moreover, as in SSC, the length of the overall pulse seems to be correlated with the cell cycle phase. In FSC-M, one can observe that the shape of the main local minimum changes. It is broadest and structured in the S phase, narrowest in the G1 phase and intermediate in the G2/M phase. In addition, the height and width of the second maximum changes.

Although these variations are discernible by eye when comparing several pulses belonging to the respective cell cycle phases, an automated objective algorithm is required to classify the pulse shapes preferentially without pre-existing knowledge about a sample.

As described in the Materials and Methods section, a wavelet transform was performed with subsequent k-means clustering at a certain level of wavelet coefficients. For the HCT116 cells, most information in the FSC channels is contained in decomposition level 4 (cf. FIG. 6 for explanation).

As FIG. 9 illustrates, the variations between the pulse shapes from cells in different phases of the cell cycle are rather small. Therefore, we considered the clusters generated not only in one channel but in two: FSC-L and FSC-M. The number of events in a cluster are plotted as a discrete 2-D histogram as in FIG. 10.

Each axis corresponds to the number of a cluster in one of the channels. The colored boxes around the histogram indicate the cell cycle phase or population associated with a cluster as will be explained in the following. The number of events found in each cluster combination is depicted by the area of the respective circle (largest circle ≙ approx. 5.5% of all events). The clustering algorithm was only applied to the events within the single cell gate shown in FIG. 8(a). All other events are summarized in a separate cluster (not shown). For analysis, only clusters with at least 100 events were considered.

The specificity of the wavelet-cluster approach can be evaluated by a comparison with the standard fluorescence analysis. For this purpose, the location of the events of a certain wavelet-cluster from FIG. 10 in a fluorescence intensity plot like FIG. 8(b) is considered. For this purpose, events from the fluorescence labeled G1, S, G2/M phase were gated to the wavelet cluster. Events from a wavelet-cluster mostly located in a certain cell cycle phase, this cluster represents cells of this phase of the cycle. Interestingly, the fluorescence labeled subsets can be assigned to multiple clusters. In FIG. 10, wavelet-clusters representing the same or similar populations have boxes of the same colors. Here, clusters that are associated with the same populations are combined.

The location of the events from the combined wavelet clusters in standard scattered intensity and fluorescence intensity plots is shown in FIG. 11. In panels (a) and (b), the clusters associated with certain cell cycle phases are included. Panels (c) and (d) show the clusters that could not be assigned to specific cell cycle phases. The colors in the dotplots of FIG. 11 match the box colors in FIG. 10.

The assignment of the wavelet-clusters to the populations found by standard fluorescent staining shows that the pulse shape data contain the relevant information and that it is possible to extract this information. However, the distinction is not perfect: the wavelet-cluster mostly contains events associated with either G1 and S or S and G2/M. There is only one cluster that is exclusively associated with cells in the G1 phase. From the light scatter dotplots in FIGS. 11(a)

and (c) it is clear that the wavelet-cluster approach finds subsets of cells that overlap in the standard FSC-SSC height dotplots and would therefore not be distinguishable.

Example 3—Distinction of Bacteria Strains

Bacteria samples were prepared according to the description in the Materials and Methods Section. Samples from two strains (called 'Bac 5' and 'Bac 8') were measured separately with the modified flow cytometer setup. Subsequently, the data from the two measurements were merged and a unique file identifier was included. The merged data file was analyzed by means of wavelet transform and k-means clustering. The resulting clusters of two channels were combined in a contingency table. The file identifier is now used to analyze the combined clusters for enrichment with one of the two bacteria types as depicted in FIG. 12(a). This procedure demonstrates the specificity of the method for distinguishing different types of bacteria. The events in the exemplary clusters are viewed in a standard overlay dotplot for the two scatter channels as in FIG. 12(b) as it would be obtained with state-of-the-art instruments. In this representation, the two strains would strongly overlap and could not be distinguished.

REFERENCE SIGNS 1 particles
2 light beam
3 radiated light
4 detector
5 angular direction(s) in which the radiated light is detected
6 main angular direction around which an angular-resolved detection is performed
7 light source
8 flow cell

LITERATURE

Cunningham, A. & Buonnacorsi, G. A. Narrow-angle forward light scattering from individual algal cells: implications for size and shape discrimination in flow cytometry. *J Plankton Res* 14, 223-234 (1992)

Darzynkiewicz, Z., Huang, X., & Zhao, H. (2017). "Analysis of cellular DNA content by flow cytometry.", Current Protocols in Cytometry, 82, 7.5.1-7.5.20. doi: 10.1002/cpcy.28

Katoh, Kaoru, et al. "Birefringence imaging directly reveals architectural dynamics of filamentous actin in living growth cones." *Molecular biology of the cell* 10.1 (1999): 197-210.

Kaye, P. H.; Hirst, E.; Clark, J. M.; Micheli, F. Airborne Particle Shape and Size Classification from Spatial Light Scattering Profiles. *Journal of Aerosol Science* 1992, 23 (6), 597-611. https://doi.org/10.1016/0021-8502(92)90027-S.

Salzman G. C., "Light Scattering Analysis of Single Cells," in *Cell Analysis*, N. Catsimpoolas, Ed. Boston, Mass.: Springer US, 1982, pp. 111-143.

Sharpless T. K., M. Bartholdi, and M. R. Melamed, "Size and refractive index dependence of simple forward angle scattering measurements in a flow system using sharply-focused illumination.," *J Histochem Cytochem.*, vol. 25, no. 7, pp. 845-856, July 1977, doi: 10.1177/25.7.330734.

Zhou, D., Teng, H., Koike, K., Koike, Y. & Okamoto, Y. Copolymers of methyl methacrylate and fluoroalkyl methacrylates: Effects of fluoroalkyl groups on the thermal and optical properties of the copolymers. *J. Polym. Sci. A Polym. Chem.* 46, 4748-4755 (2008).

What is claimed is:

1. A method for characterizing particles using a flow cytometer comprising:
   a. passing of one or more particles in a fluid stream through a light beam of the flow cytometer,
   b. detecting radiated light as one or more particles pass through the light beam using two or more detectors positioned to allow for the detection of the radiated light (3) in two or more angular directions,
   c. generating for each of the angular directions a waveform which is a digital representation of the detected radiated light for said angular direction, and
   d. transforming each waveform using one or more basis functions and obtaining one or more coefficients characterizing the waveform;
   wherein the radiated light is detected in two or more angular directions within a vicinity of a main angular direction and wherein the two or more angular directions deviate from the said main direction of detection by no more than $20°$ and wherein the detection of radiated light in each of the two or more angular direction should integrate the radiated light over an angle of not more than $2°$.

2. Method according to claim 1, wherein the detected radiated light is a forward scatter signal, a side scatter signal and/or a fluorescence light and the two or more detectors are positioned to allow for detection of a forward scatter signal, a side scatter signal and/or a fluorescence light in two or more angular directions.

3. Method according to claim 1, wherein the radiated light is detected using three or more detectors linearly arranged along a one-dimensional array and/or the radiated light is detected using four or more detectors in two-dimensional array.

4. Method according to claim 1, wherein the method comprises the step of assigning at least one biological and/or physical property of the particles based upon the one or more coefficients characterizing the waveforms.

5. Method according to claim 1, wherein the assigned physical or biological property of the one or more particles is selected from the group consisting of size, shape, refractive index, particle type, morphology, granularity, internal structure, localization, co-localization, and/or distribution of molecules within the particle and/or on the particle surface or allows for a distinction between single particles, aggregates of multiple particles or fragments of particles.

6. Method according to claim 1, wherein the particles are selected from a group comprising cells, vesicles, nuclei, microorganisms, beads, proteins, nucleic acids, pollen, extracellular vesicles or any combination thereof.

7. Method according to claim 1, wherein the particles are cells and the determined property of the cells is or is associated with cell type, cell cycle, localization or distribution of molecules within the cell and/or on the cell surface, the amount of debris on the cell, structural elements of the cell such as the nucleus or the cytoskeleton, antibody or antibody-fragment binding to the cell, cell morphology and/or allows for the distinction between single cells, aggregates of multiple cells, dry cell mass or fragment of cells (debris).

8. Method according to claim 1, wherein the waveform is transformed by a wavelet transformation.

9. Method according to claim 8, wherein the wavelet transformation is selected from the group consisting of a discrete wavelet transformation, a continuous wavelet transformation, a single level wavelet transformation, a multi-level wavelet transform or combinations thereof, wherein the basis function of the discrete wavelet transformation is preferably selected from Haar wavelets, Daubechies wavelets or symlet wavelets.

10. Method according to claim 1, wherein the waveform is transformed using a Fourier transformation.

11. Method according to claim 10, wherein the Fourier transformation is selected from the group consisting of discrete Fourier transform, fast Fourier Transforms, short-time Fourier transforms or any combination thereof.

12. Method according to claim 1, wherein the coefficients characterizing the waveforms are analysed using a multivariate statistical model.

13. Method according to claim 12, wherein the multivariate statistical model is a principal component analysis or a cluster analysis.

14. Method according to claim 12, wherein the multivariate statistical model is used to identify clusters of coefficients characterizing said waveforms that indicate a common property of the corresponding particles.

15. Flow cytometry system comprising:
a source for a fluid and particles,
a flow cell configured to generate a fluid stream comprising the particles,
a light source configured to generate a light beam that illuminates the fluid stream comprising the particles,
two or more detectors positioned and configured to detect the radiated light of the particles in two or more angular directions, wherein the radiated light is detected in two or more angular directions within a vicinity of a main angular direction and wherein the two or more angular directions deviate from the said main direction of detection by no more than 20° and wherein the detection of radiated light in each of the two or more angular direction should integrate the radiated light over an angle of not more than 2° and
a processing unit configured to generate a waveform based upon the detected radiated light, to transform said waveform using one or more basis functions and obtaining to obtain one or more coefficients characterizing the waveform.

16. Flow cytometry system according to claim 15, wherein the two or more detectors are positioned to allow for detection of a forward scatter signal, a side scatter signal and/or a fluorescence light in two or more angular directions.

17. Flow cytometry system according to claim 15, wherein the flow cytometry system comprises three or more detectors linearly arranged along a one-dimensional array to detect the radiated light of the particles in three or more angular directions and/or four or more detectors arranged in a two-dimensional array to allow for the detection of the radiated light in four or more, preferably nine or more, angular directions.

18. Flow cytometry system according to claim 15, wherein the flow cytometry system comprises a sorter for the particles configured to sort the particles based upon the coefficients characterizing the waveforms.

19. Flow cytometry system according to claim 15, wherein the processing unit comprises an ADC and a FPGA, wherein the waveforms are generated from the detected radiated light using the ADC and the waveforms are transformed using a field programmable gate array (FPGA).

* * * * *